United States Patent
Slusar et al.

(10) Patent No.: US 11,068,998 B1
(45) Date of Patent: *Jul. 20, 2021

(54) POLYNOMIAL RISK MAPS

(71) Applicant: Allstate Insurance Company, Northbrook, IL (US)

(72) Inventors: Mark Slusar, Chicago, IL (US); Regina Madigan, Mountain View, CA (US); Timothy W. Gibson, Barrington, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,215

(22) Filed: Jun. 18, 2020

Related U.S. Application Data

(63) Continuation of application No. 15/268,750, filed on Sep. 19, 2016, now Pat. No. 10,699,347, which is a continuation-in-part of application No. 15/052,291, filed on Feb. 24, 2016.

(51) Int. Cl.
  *G06Q 40/08* (2012.01)
  *G01C 21/36* (2006.01)
(52) U.S. Cl.
  CPC ......... *G06Q 40/08* (2013.01); *G01C 21/3667* (2013.01)
(58) Field of Classification Search
  CPC .................................................... G06Q 40/00
  USPC ......................................................... 705/38
  See application file for complete search history.

(56) References Cited

U.S. PATENT DOCUMENTS

| | | | |
|---|---|---|---|
| 5,467,388 | A | 11/1995 | Redd, Jr. et al. |
| 5,499,182 | A | 3/1996 | Ousborne |
| 5,619,568 | A | 4/1997 | Miller |
| 6,175,803 | B1 | 1/2001 | Chowanic et al. |
| 6,233,445 | B1 | 5/2001 | Boltz et al. |
| 6,351,698 | B1 | 2/2002 | Kubota et al. |

(Continued)

FOREIGN PATENT DOCUMENTS

| | | |
|---|---|---|
| EP | 0700009 A2 | 3/1996 |
| JP | 2015169472 A | 9/2015 |
| WO | 2011004372 A2 | 1/2011 |

OTHER PUBLICATIONS

Jul. 22, 2020—(CA) Office Action—App. No. 3015235.

(Continued)

*Primary Examiner* — Kirsten S Apple
(74) *Attorney, Agent, or Firm* — Banner & Witcoff, Ltd.

(57) ABSTRACT

A system including a computing device may receive base map information, including attribute information associated with a plurality of road segments, and trip request information. Based on this information, a route for the user to travel may be determined. The system might further calculate a risk score for each road segment forming the route, and generate a risk map based on the risk score and the route. The risk map may then be displayed to a user. The risk map may include markers or other objects depicting potential risks along the route the driver may face. Also, the risk map may be updated based on information collected from a sensor coupled to the vehicle or located at the road segment to reflect actual, real-time risk scores calculated using an equation for providing a risk score for a particular driver driving a particular vehicle on a particular road segment.

20 Claims, 18 Drawing Sheets

(56) References Cited

U.S. PATENT DOCUMENTS

| | | | |
|---|---|---|---|
| 6,629,029 B1 | 9/2003 | Giles | |
| 6,868,386 B1 | 3/2005 | Henderson et al. | |
| 7,167,787 B2 | 1/2007 | Bastian et al. | |
| 7,292,152 B2 | 11/2007 | Torkkola et al. | |
| 7,356,516 B2* | 4/2008 | Richey | G06Q 10/087 705/80 |
| 7,535,344 B2* | 5/2009 | Obradovich | B60T 8/172 340/426.33 |
| 7,565,230 B2 | 7/2009 | Gardner et al. | |
| 7,657,441 B2* | 2/2010 | Richey | G06Q 20/02 705/1.1 |
| 7,659,827 B2 | 2/2010 | Gunderson et al. | |
| 7,742,792 B2 | 6/2010 | Matsui | |
| 8,090,598 B2 | 1/2012 | Bauer et al. | |
| 8,270,933 B2 | 9/2012 | Riemer et al. | |
| 8,275,348 B2 | 9/2012 | Yen et al. | |
| 8,311,858 B2 | 11/2012 | Everett et al. | |
| 8,314,708 B2 | 11/2012 | Gunderson et al. | |
| 8,332,242 B1 | 12/2012 | Medina, III | |
| 8,355,818 B2 | 1/2013 | Nielsen et al. | |
| 8,489,433 B2 | 7/2013 | Altieri et al. | |
| 8,506,512 B2 | 8/2013 | Aklog et al. | |
| 8,508,353 B2 | 8/2013 | Cook et al. | |
| 8,538,687 B2 | 9/2013 | Plocher et al. | |
| 8,606,512 B1* | 12/2013 | Bogovich | G01C 21/3415 701/423 |
| 8,612,139 B2 | 12/2013 | Wang et al. | |
| 8,620,575 B2 | 12/2013 | Vogt et al. | |
| 8,626,444 B2 | 1/2014 | Li et al. | |
| 8,655,965 B2 | 2/2014 | McWithey et al. | |
| 8,682,699 B2 | 3/2014 | Collins et al. | |
| 8,686,872 B2 | 4/2014 | Szczerba et al. | |
| 8,712,429 B2 | 4/2014 | Nagorniak | |
| 8,731,768 B2 | 5/2014 | Fernandes et al. | |
| 8,744,492 B2 | 6/2014 | Kuo | |
| 8,805,707 B2 | 8/2014 | Schumann, Jr. et al. | |
| 8,810,425 B2 | 8/2014 | Hyde et al. | |
| 8,824,997 B2 | 9/2014 | Gehlen et al. | |
| 8,860,564 B2 | 10/2014 | Rubin et al. | |
| 8,930,229 B2 | 1/2015 | Bowne et al. | |
| 8,971,927 B2 | 3/2015 | Zhou et al. | |
| 9,020,749 B2 | 4/2015 | Aso et al. | |
| 9,020,751 B1 | 4/2015 | Bogovich et al. | |
| 9,066,210 B2 | 6/2015 | Kalita et al. | |
| 9,082,072 B1 | 7/2015 | Wedding, Jr. et al. | |
| 9,142,142 B2 | 9/2015 | Nath et al. | |
| 9,150,154 B2 | 10/2015 | Miller et al. | |
| 9,207,675 B1 | 12/2015 | Walser et al. | |
| 9,519,670 B2 | 12/2016 | Stanek et al. | |
| 9,574,888 B1 | 2/2017 | Hu et al. | |
| 9,851,214 B1* | 12/2017 | Chintakindi | G01C 21/3484 |
| 10,019,904 B1* | 7/2018 | Chan | G08G 1/205 |
| 2002/0046064 A1* | 4/2002 | Maury | G06Q 40/08 705/4 |
| 2002/0059084 A1 | 5/2002 | Wahlbin et al. | |
| 2004/0210353 A1 | 10/2004 | Rice | |
| 2004/0214615 A1 | 10/2004 | Entenmann et al. | |
| 2005/0060069 A1 | 3/2005 | Breed et al. | |
| 2005/0086227 A1 | 4/2005 | Sullivan et al. | |
| 2006/0053038 A1 | 3/2006 | Warren et al. | |
| 2006/0200008 A1 | 9/2006 | Moore-Ede | |
| 2006/0247852 A1 | 11/2006 | Kortge et al. | |
| 2007/0027726 A1 | 2/2007 | Warren et al. | |
| 2007/0136107 A1 | 6/2007 | Maguire et al. | |
| 2007/0226014 A1 | 9/2007 | Alemayehu et al. | |
| 2007/0268158 A1 | 11/2007 | Gunderson et al. | |
| 2008/0016145 A1 | 1/2008 | Takase et al. | |
| 2008/0059351 A1* | 3/2008 | Richey | G06Q 10/10 705/35 |
| 2008/0065427 A1 | 3/2008 | Helitzer et al. | |
| 2008/0120175 A1 | 5/2008 | Doering | |
| 2008/0243321 A1 | 10/2008 | Walser et al. | |
| 2008/0243558 A1 | 10/2008 | Gupte | |
| 2008/0255722 A1 | 10/2008 | McClellan et al. | |
| 2008/0255888 A1 | 10/2008 | Berkobin et al. | |
| 2008/0262670 A1 | 10/2008 | McClellan et al. | |
| 2008/0270519 A1 | 10/2008 | Ekdahl et al. | |
| 2008/0319602 A1 | 12/2008 | McClellan et al. | |
| 2009/0024273 A1 | 1/2009 | Follmer et al. | |
| 2009/0024419 A1 | 1/2009 | McClellan et al. | |
| 2009/0079555 A1 | 3/2009 | Aguirre De Carcer et al. | |
| 2009/0132294 A1 | 5/2009 | Haines | |
| 2010/0030582 A1 | 2/2010 | Rippel et al. | |
| 2010/0030592 A1 | 2/2010 | Evans et al. | |
| 2010/0042314 A1 | 2/2010 | Vogt et al. | |
| 2010/0057358 A1 | 3/2010 | Winer et al. | |
| 2010/0063850 A1 | 3/2010 | Daniel | |
| 2010/0131303 A1* | 5/2010 | Collopy | G06Q 30/0265 705/4 |
| 2010/0131304 A1 | 5/2010 | Collopy et al. | |
| 2010/0157061 A1 | 6/2010 | Katsman et al. | |
| 2010/0174566 A1 | 7/2010 | Helitzer et al. | |
| 2010/0205012 A1 | 8/2010 | McClellan | |
| 2010/0211259 A1 | 8/2010 | McClellan | |
| 2010/0238009 A1 | 9/2010 | Cook et al. | |
| 2010/0250021 A1 | 9/2010 | Cook et al. | |
| 2010/0292886 A1 | 11/2010 | Szczerba et al. | |
| 2010/0323673 A1 | 12/2010 | Etram et al. | |
| 2011/0009107 A1 | 1/2011 | Guba et al. | |
| 2011/0039581 A1 | 2/2011 | Cai et al. | |
| 2011/0054716 A1 | 3/2011 | Stahlin et al. | |
| 2011/0090221 A1 | 4/2011 | Ren | |
| 2011/0092159 A1 | 4/2011 | Park et al. | |
| 2011/0106370 A1 | 5/2011 | Duddle et al. | |
| 2011/0144909 A1 | 6/2011 | Ren et al. | |
| 2011/0161116 A1* | 6/2011 | Peak | G01C 21/36 705/4 |
| 2011/0196571 A1 | 8/2011 | Foladare et al. | |
| 2011/0205043 A1 | 8/2011 | Fujiki et al. | |
| 2011/0213628 A1 | 9/2011 | Peak et al. | |
| 2011/0219080 A1 | 9/2011 | McWithey et al. | |
| 2011/0269441 A1 | 11/2011 | Silver | |
| 2011/0320492 A1 | 12/2011 | Inghelbrecht | |
| 2012/0004933 A1 | 1/2012 | Foladare et al. | |
| 2012/0010906 A1 | 1/2012 | Foladare et al. | |
| 2012/0021386 A1 | 1/2012 | Anderson et al. | |
| 2012/0072243 A1 | 3/2012 | Collins et al. | |
| 2012/0072244 A1 | 3/2012 | Collins et al. | |
| 2012/0083287 A1 | 4/2012 | Casto et al. | |
| 2012/0101855 A1 | 4/2012 | Collins et al. | |
| 2012/0109692 A1 | 5/2012 | Collins et al. | |
| 2012/0123806 A1* | 5/2012 | Schumann, Jr. | G06Q 40/08 705/4 |
| 2012/0166229 A1 | 6/2012 | Collins et al. | |
| 2012/0197669 A1 | 8/2012 | Kote et al. | |
| 2012/0209632 A1 | 8/2012 | Kaminski et al. | |
| 2012/0226421 A1 | 9/2012 | Kote et al. | |
| 2012/0246192 A1 | 9/2012 | Kenyon | |
| 2012/0253586 A1 | 10/2012 | Sakakibara | |
| 2012/0289214 A1 | 11/2012 | Hynes et al. | |
| 2012/0311416 A1 | 12/2012 | Richter et al. | |
| 2012/0316933 A1* | 12/2012 | Pentland | G06Q 30/02 705/14.1 |
| 2013/0006674 A1 | 1/2013 | Bowne et al. | |
| 2013/0006675 A1 | 1/2013 | Bowne et al. | |
| 2013/0006715 A1 | 1/2013 | Warkentin et al. | |
| 2013/0024060 A1 | 1/2013 | Sukkarie et al. | |
| 2013/0046559 A1 | 2/2013 | Coleman et al. | |
| 2013/0073321 A1* | 3/2013 | Hofmann | G06Q 40/08 705/4 |
| 2013/0078963 A1 | 3/2013 | Prasad et al. | |
| 2013/0090803 A1 | 4/2013 | Stahlin et al. | |
| 2013/0110310 A1 | 5/2013 | Young | |
| 2013/0124082 A1 | 5/2013 | Cho | |
| 2013/0137404 A1 | 5/2013 | Kuo | |
| 2013/0151288 A1 | 6/2013 | Bowne et al. | |
| 2013/0157640 A1 | 6/2013 | Aycock | |
| 2013/0166325 A1* | 6/2013 | Ganapathy | G06Q 40/08 705/4 |
| 2013/0238233 A1 | 9/2013 | Kim et al. | |
| 2013/0304514 A1* | 11/2013 | Hyde | G06Q 40/08 705/4 |
| 2013/0317736 A1 | 11/2013 | Fernandes et al. | |

(56) References Cited

U.S. PATENT DOCUMENTS

| | | | |
|---|---|---|---|
| 2014/0019170 A1 | 1/2014 | Coleman et al. | |
| 2014/0067434 A1 | 3/2014 | Boume et al. | |
| 2014/0074402 A1 | 3/2014 | Hassib et al. | |
| 2014/0080100 A1 | 3/2014 | Phelan et al. | |
| 2014/0180723 A1 | 6/2014 | Cote et al. | |
| 2014/0207497 A1 | 7/2014 | Collins et al. | |
| 2014/0222280 A1 | 8/2014 | Salomonsson et al. | |
| 2014/0257869 A1 | 9/2014 | Binion et al. | |
| 2014/0257871 A1* | 9/2014 | Christensen | G06Q 30/0207 705/4 |
| 2014/0267263 A1 | 9/2014 | Beckwith et al. | |
| 2014/0267627 A1 | 9/2014 | Freeman et al. | |
| 2014/0268353 A1 | 9/2014 | Fujimura et al. | |
| 2014/0277939 A1 | 9/2014 | Ren et al. | |
| 2014/0336866 A1 | 11/2014 | Kloeden et al. | |
| 2014/0350970 A1 | 11/2014 | Schumann, Jr. et al. | |
| 2014/0358840 A1 | 12/2014 | Tadic et al. | |
| 2015/0006207 A1* | 1/2015 | Jarvis | G06Q 10/06398 705/4 |
| 2015/0056973 A1 | 2/2015 | Efrati | |
| 2015/0066360 A1 | 3/2015 | Kirsch | |
| 2015/0112545 A1 | 4/2015 | Binion et al. | |
| 2015/0112730 A1 | 4/2015 | Binion et al. | |
| 2015/0112800 A1 | 4/2015 | Binion et al. | |
| 2015/0172450 A1 | 6/2015 | Singhal | |
| 2015/0187016 A1 | 7/2015 | Adams et al. | |
| 2015/0187019 A1* | 7/2015 | Fernandes | G06Q 40/08 705/4 |
| 2015/0241226 A1 | 8/2015 | Engelman et al. | |
| 2016/0047666 A1* | 2/2016 | Fuchs | G06Q 40/08 701/423 |
| 2016/0050315 A1 | 2/2016 | Malhotra et al. | |
| 2016/0073240 A1 | 3/2016 | Helm | |
| 2016/0134744 A1 | 5/2016 | de la Fuente Sanchez | |
| 2016/0231278 A1 | 8/2016 | Goroshevskiy et al. | |
| 2017/0122989 A1 | 5/2017 | Ho | |
| 2018/0158334 A1 | 6/2018 | Perez Barrera et al. | |
| 2018/0162410 A1 | 6/2018 | Skillsater et al. | |
| 2018/0362026 A1 | 12/2018 | Heimberger et al. | |

OTHER PUBLICATIONS

Aug. 24, 2020—(EP) Examination Report—App. No. 16849502.6.
Aug. 18, 2020—(IN) Examination Report—App. No. 201817034104.
Sep. 23, 2020—U.S. Final Office Action—U.S. Appl. No. 15/052,291.
Jul. 13, 2020—(EP) Office Action—App. No. 16891883.7.
Nov. 20, 2020—U.S. Notice of Allowance—U.S. Appl. No. 14/863,476.
"Continental Head-up Display Augmented Reality HUD" http://continental-head-up-display.com/ website last visited on Apr. 30, 2015.
"In the Future, Your Car's Windscreen Will Be an Augmented Reality Display" https://transportevolved.com/2014/09/29/future-cars-windscreen-will-augmented-reality-display/ website last visited on Apr. 30, 2015.
"Autonomous Cars from Berlin" website: http://autonomos-labs.com/research/ website last visited on Apr. 30, 2015.
Williams, Geoff—Should You Try Pay-As-You-Drive Insurance?, Jan. 13, 2014, http://money.usnews.com/money/personal-finance/articles/2014/01/13/should-you-try-pay-as-you-drive-insurance, U.S. News & World Report.
Rafter, Michelle—Use-Based Insurance Shifts Into High Gear, http://www.edmunds.com/auto-insurance/pay-as-you-drive-insurance-goes-into-high-gear.html, Feb. 27, 2014, Edmunds.
Chalon Smith, Mark—Pay-As-You-Drive Discounts: A Guide, http://www.insurance.com/auto-insurance/saving-money/low-mileage-discounts-guide.html, Apr. 22, 2015, Insurance.com.
How's My Driving?—http://www.economist.com/news/finance-and-economics/21572237-gizmos-track-driving-habits-are-changing-face-car-insurance-hows-my—Feb. 23, 2013—Print Edition of the Economist.
Usage-Based Insurance and Telematics, http://www.naic.org/cipr_topics/topic_usage_based_insurance.htm, Last Updated Dec. 14, 2015—National Association of Insurance Commissioners & The Center for Insurance Policy and Research.
Dewri, Rinku et al—Inferring Trip Destinations From Driving Habits Data, http://www.cs.du.edu/~rdewri/data/MyPapers/Conferences/2013WPES-Extended.pdf, Last Visited Feb. 25, 2016.
Rosolino, V. et al: "Road Safety Performance Assessment: A New Road Network Risk Index for Info Mobility", ScienceDirect: Procedia—Social and Behavioral Sciences 111 (2014) pp. 624-633.
Li, Z et. al.: "Road Risk Modeling and Cloud-Aided Safety-Based Route Planning", Published in Cybernetics, IEEE Translations dated Oct. 2, 2015, pp. 1-2.
"Road Asset Management", https://www.arrb.com/au/Infrastructure/Road-asset-management.aspx, Last visited Oct. 8, 2015, pp. 1-5.
Dec. 5, 2016 (WO)—International Search Report and Written Opinion—App. PCT/US2016/052877.
Feb. 2, 2017—(WO) International Search Report—App PCT/US2016/063527.
"Telematics: Reinventing Auto Insurance," retrieved Sep. 6, 2011 from http://www.insurancetech.com/blog/archives/2010/03/telematics_the.html, 10 pages.
"Axeda and Walsh Vision Announce Alliance for Cloud Telematics Solutions" retrieved Sep. 6, 2011 from http://www.cbs19.tv/story/15234817/axeda-and-walsh-vision-announce-alliance-for-cloud-telematics-solutions pp. 1-4.
Jul. 13, 2015 U.S. Non-Final Office Action—U.S. Appl. No. 14/066,988.
Sep. 30, 2015 U.S. Non-Final Office Action—U.S. Appl. No. 14/227,740.
Jul. 20, 2015—U.S. Non-Final Office Action—U.S. Appl. No. 13/564,524.
Sep. 1, 2016—U.S. Final Office Action—U.S. Appl. No. 13/564,524.
Jun. 10, 2016 U.S. Non-Final Office Action—U.S. Appl. No. 14/066,988.
Nov. 22, 2016—U.S. Final Office Action—U.S. Appl. No. 14/066,988.
Mar. 28, 2016—U.S. Non-Final Office Action—U.S. Appl. No. 13/564,524.
Nov. 23, 2015—U.S. Final Office Action—U.S. Appl. No. 13/564,524.
Feb. 4, 2014—U.S. Final Office Action—U.S. Appl. No. 13/564,524.
Oct. 8, 2013—U.S. Non-Final Office Action—U.S. Appl. No. 13/564,524.
Mar. 23, 2016—U.S. Final Office Action—U.S. Appl. No. 14/227,740.
Jan. 31, 2017—U.S. Non-Final Office Action—U.S. Appl. No. 14/227,740.
Nov. 23, 2015—U.S. Final Office Action—U.S. Appl. No. 14/066,988.
Shabeer, et. al, "Mobile Communication Safety on Road Transport," WSEAS Transactions on Communications, E-ISSN: 2224-2864, Issue 3, vol. 12, Mar. 2013, 12 pages.
"Drive Control—For When you Need a Little More Self Control," retrieved Apr. 8, 2016 from https://drivecontrolapp.com, 2 pages.
Mar. 3, 2017—U.S. Non-Final Office Action—U.S. Appl. No. 15/284,801.
Jun. 6, 2017—U.S. Non-Final Office Action—U.S. Appl. No. 13/564,524.
Jun. 7, 2017—U.S. Final Office Action—U.S. Appl. No. 14/227,740.
May 19, 2017 (WO) International Search Report and Written Opinion—App. PCT/IN2016/050370.
May 24, 2017—(WO) International Search Report and Written Opinion—PCT/IN16/50369.
Jun. 23, 2017—U.S. Non-Final Office Action—U.S. Appl. No. 15/284,728.
Martin Demers, "Waste Fleet Safety: Influencing Driver Behavior" 2010 Waste Management Magazine, pp. 1-3.
Insurance Companies Utilizing Technology Fairbault Daily News, May 10, 2011, http://www.fairbault.com/print/11435 pp. 1-3.
Aug. 9, 2017—U.S. Final Office Action—U.S. Appl. No. 15/284,801.
Sep. 12, 2017—U.S. Final Office Action—U.S. Appl. No. 13/564,524.
Sep. 13, 2017—U.S. Non-Final Office Action—U.S. Appl. No. 14/066,988.
Nov. 16, 2017—U.S. Non-Final Office Action—U.S. Appl. No. 14/863,476.
Nov. 22, 2017—U.S. Notice of Allowance—U.S. Appl. No. 15/284,728.
Jan. 24, 2018—U.S. Notice of Allowance—U.S. Appl. No. 15/284,801.

(56) References Cited

OTHER PUBLICATIONS

Feb. 26, 2018—U.S. Non-Final Office Action—U.S. Appl. No. 14/227,740.
Mar. 1, 2018—U.S. Non-Final Office Action—U.S. Appl. No. 15/284,728.
Mar. 20, 2018—U.S. Non-Final Office Action—U.S. Appl. No. 15/052,291.
Jun. 29, 2018—U.S. Non-Final Office Action—U.S. Appl. No. 15/959,527.
Aug. 3, 2018—U.S. Final Office Action—U.S. Appl. No. 14/863,476.
Sep. 4, 2018—U.S. Notice of Allowance—U.S. Appl. No. 15/284,728.
Oct. 17, 2018 U.S. Final Office Action—U.S. Appl. No. 15/052,291.
Nov. 2, 2018—U.S. Non-Final Office Action—U.S. Appl. No. 15/160,208.
Nov. 28, 2018—U.S. Non-Final Office Action—U.S. Appl. No. 15/268,750.
Nov. 29, 2018—U.S. Notice of Allowance—U.S. Appl. No. 15/959,527.
Dec. 5, 2018—U.S. Notice of Allowance—U.S. Appl. No. 15/284,728.
Apr. 2, 2018—U.S. Non-Final Office Action—U.S. Appl. No. 15/052,291.
Apr. 12, 2019—U.S. Final Office Action—U.S. Appl. No. 15/268,750.
May 24, 2019—(EP) Extended Supplemental Search Report—EP Application No. 16849502.6.
"Junior: The Stanford Entry in the Urban Challenge", Michael Montemerlo et al., Journal of Field Robotics, vol. 25, No. 9, Sep. 1, 2008, pp. 569-597, XP055169616.
"Moving Object Detection with Laser Scanners", Christoph Mertz et al., Journal of Field Robotics, vol. 30, No. 1, Jul. 3, 2012, pp. 17-43, XP055460334.
May 31, 2019 U.S. Non-Final Office Action—U.S. Appl. No. 14/863,476
Jun. 13, 2019—(CA) Office Action—Application No. 3,015,235.
Sep. 6, 2019—(EP) Extended Search Report—Application No. 16891883.7.
Oct. 2, 2019—U.S. Non-Final Office Action—U.S. Appl. No. 15/268,750.
Nov. 13, 2019—U.S. Final Office Action—U.S. Appl. No. 15/052,291.
Sep. 30, 2019—(CA) Notice of Allowance—Application No. 2,999,498.
Dec. 23, 2019—U.S. Notice of Allowance—U.S. Appl. No. 15/268,750.
Feb. 7, 2020—U.S. Final Office Action—U.S. Appl. No. 14/863,476.
Mar. 27, 2020—U.S. Non-Final Office Action—U.S. Appl. No. 15/052,291.
May 14, 2020—U.S. Notice of Allowance—U.S. Appl. No. 15/268,750.

\* cited by examiner

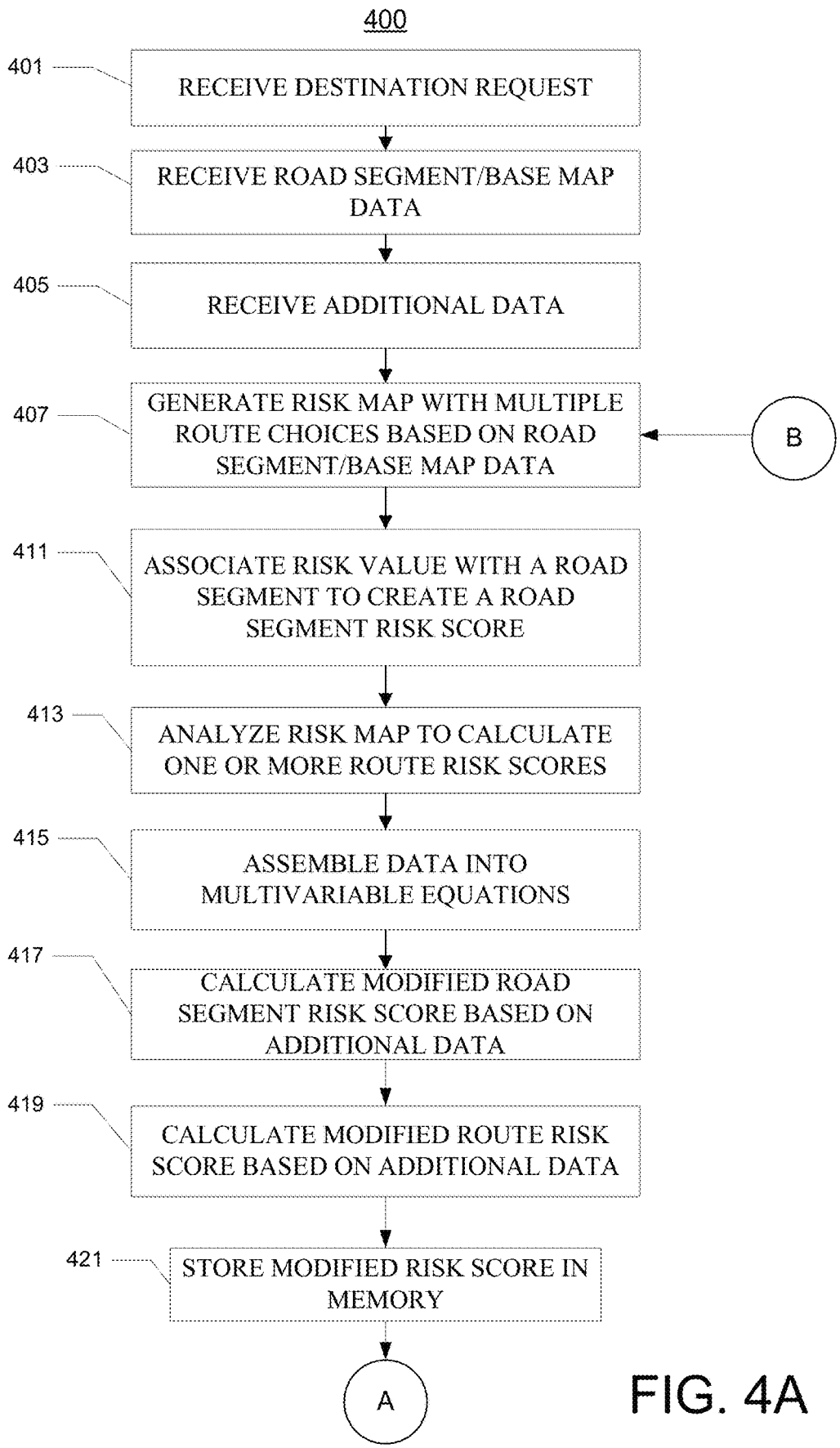

POLYNOMIAL RISK MAPS

CROSS-REFERENCE TO RELATED APPLICATION

This application is a continuation of and claims priority to U.S. application Ser. No. 15/268,750, filed on Sep. 19, 2016, which is a continuation-in-part of and claims priority to U.S. application Ser. No. 15/052,291, filed on Feb. 24, 2016 and entitled "Risk Maps," which is hereby incorporated by reference in its entirety herein.

BACKGROUND

Nowadays, many vehicles come equipped with global positioning system (GPS) devices that help drivers to navigate roads to various locations. Moreover, many drivers use other mobile devices (e.g., smartphones) that have GPS devices therein to help the drivers navigate roads. These GPS devices may provide location information and use maps for navigation purposes. As GPS devices have become more prevalent, the different uses for their location information have come to light. In some instances, the danger level of different routes is determined by combining location information and accident history information. Although some entities may find the danger level of certain routes useful and interesting, such information alone might not relate to the amount of risk a driver assumes traveling a particular route, or the cost to insure a driver while traveling a particular route. Therefore, there remains a desire for methods and systems that may determine the risk level of the roads drivers travel and a cost of insurance for traveling those roads.

Additionally, it is difficult to use the location information to determine the cost of insurance per a route traveled when the location information merely includes GPS coordinates. Insurance providers may find determining the cost of insurance per a route particularly important. When a driver (or insurance policy holder of the vehicle) travels one route compared to another route, the driver may be assuming more risk due to different conditions along the route they chose to travel. The insurance provider may wish to determine the cost of insurance for traveling a particular route in order to properly cover and insure a driver based on the risk they are exposed to while traveling the particular route. Currently, policyholders pay for or purchase insurance based on their driving history, individual characteristic, location, and amount of travel. There is a desire for methods and systems that facilitate a map that identifies and determines the risks along routes traveled during a trip, the amount of insurance coverage needed for the trip, and the cost of insurance based on the risks faced along the roads traveled during the trip.

SUMMARY

The following summary is for illustrative purposes only and is not intended to limit or constrain the detailed description. The following summary merely presents various described aspects in a simplified form as a prelude to a more detailed description provided below.

Various approaches to helping users identify and mitigate risk are presented. In accordance with aspects of the disclosure, a computing system may generate, based on a vehicle traveling on a segment of road, a map for identifying and alerting a user of a potential risk. The system may receive various types of information, including but not limited to, accident information, geographic information, road characteristic information, environmental information, risk information, base map data/information, road segment data/information, road attribute (attribute) information, and vehicle information from one or more sensors, servers, and/or computing devices. The system may generate a risk map using the received information. The system may calculate a risk score, route risk score, road risk score, road segment risk score, risk object risk score, etc., and associate the risk score to a particular road segment, route, and/or risk map. Further, the system may provide alerts to a user by indicating an identification of a risk object based on the calculated risk score of the risk object. The system may provide an insurance premium based on the route traveled and the risk scores associated with the route traveled.

In other aspects of the present disclosure, a personal navigation device, mobile device, and/or personal computing device may communicate, directly or indirectly, with a server (or other device) to transmit and receive a risk score(s), a risk map(s), and/or received information. The device may receive travel route information and query the memory for associated risk scores and risk maps (e.g., base maps). The risk scores may be sent for display on the device (via the risk map) or for recording in memory. The contents of memory may also be uploaded to a system data storage device for use by a network device (e.g., server) to perform various actions. For example, an insurance company may use the information stored in the system data storage device to take various actions (e.g., determine an insurance premium, create an insurance premium, adjust an insurance premium, safety warnings, etc.).

In other aspects of the disclosure, a personal navigation device, mobile device, and/or personal computing device may access a database of risk scores to assist in identifying and indicating alternate lower-risk travel routes. A driver may select among the various travel routes presented, taking into account one or more factors such as the driver's tolerance for risk or the driver's desire to lower the cost of their insurance. These factors may be saved in memory designating the driver's preferences. Depending on the driver's selection or other road or weather conditions, the cost or other aspects of the vehicle's insurance coverage may be adjusted accordingly for either the current insurance policy period or a future insurance policy period. In some cases, the cost or other aspects of the vehicle's insurance coverage may be adjusted accordingly on a per trip basis.

Certain other aspects of the disclosure include a system including a first computing device configured to communicate with one or more devices to receive base map information, wherein the base map information may include a plurality of attribute information associated to a plurality of road segments. The system may also include a first computing device configured to receive trip request information from a user device operated by a user, and determine a route for the user to travel based on the trip request information, wherein determining the route includes using the base map information and the trip request information. The system might further include a first computing device configured to calculate a risk score for each road segment of the plurality of road segments used to generate the route, generate a risk map based on the risk score and the route and time comparisons, and provide the risk map to the user.

The details of these and other aspects of the disclosure are set forth in the accompanying drawings and descriptions below. Other features and advantages of aspects of the disclosure may be apparent from the descriptions and drawings.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 4A and 4B depict a flowchart of an example process in accordance with aspects of the present disclosure.

DETAILED DESCRIPTION

In accordance with various aspects of the disclosure, methods, non-transitory computer-readable media, and apparatuses are disclosed for generating a risk map and alerting a driver of a vehicle about a potential risk on a road the vehicle is traveling.

Figure 1:
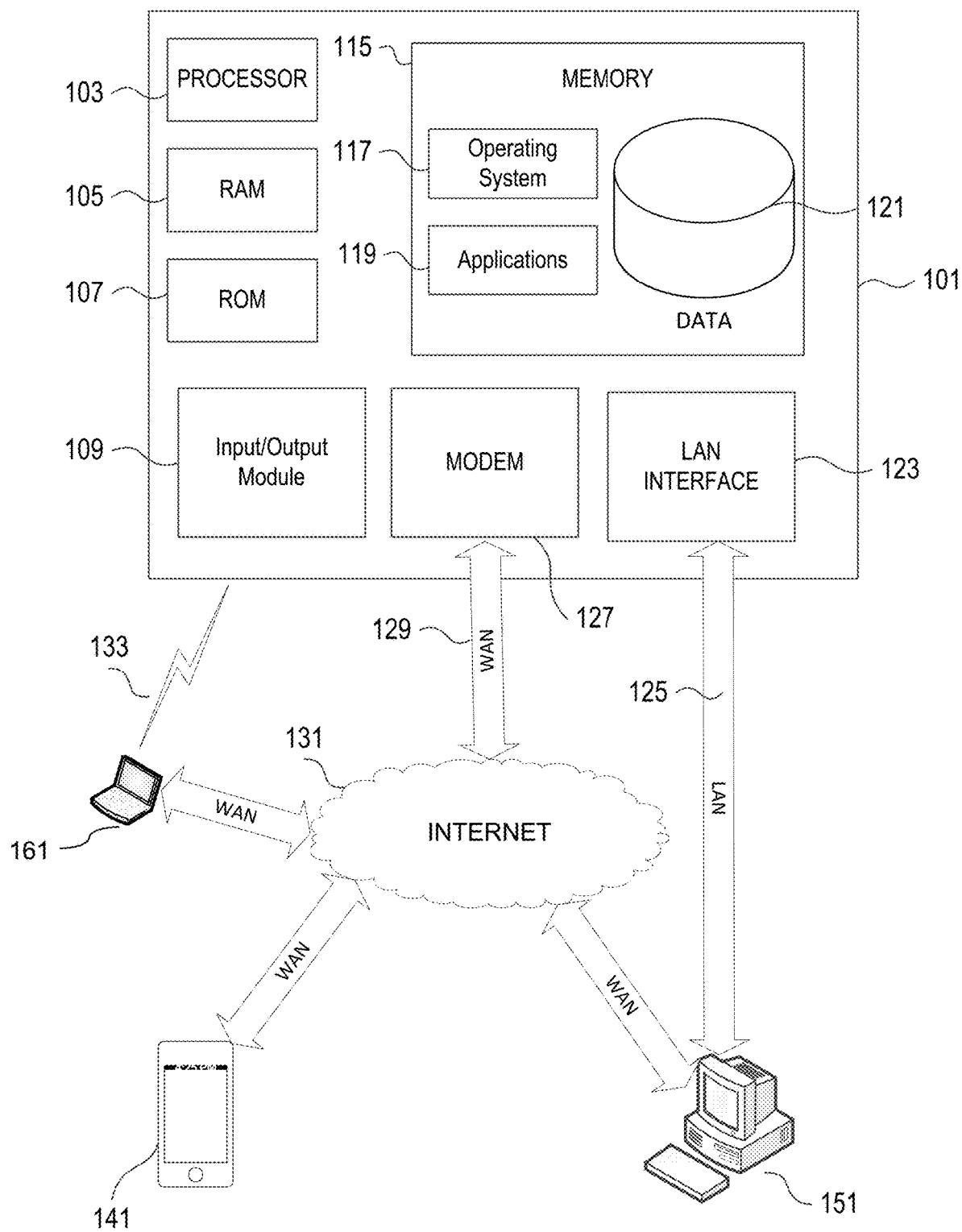
FIG. 1 illustrates an example operating environment in accordance with aspects of the present disclosure.

FIG. 1 illustrates an example of a suitable computing system 100 that may be used according to one or more illustrative embodiments. The computing system 100 is only one example of a suitable computing system and is not intended to suggest any limitation as to the scope of use or functionality contained in the present disclosure. The computing system 100 should not be interpreted as having any dependency or requirement relating to any one or combination of components shown in the illustrative computing system.

The present disclosure is operational with numerous other general purpose or special purpose computing systems or configurations. Examples of well-known computing systems, environments, and/or configurations that may be suitable for use with the disclosed embodiments include, but are not limited to, personal computers (PCs), server computers, hand-held or laptop devices, mobile devices, tablets, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system 100 may include a computing device 101 wherein the processes discussed herein may be implemented. The computing device 101 may have a processor 103 for controlling the overall operation of the random access memory (RAM) 105, read-only memory (ROM) 107, input/output module 109, memory 115, modem 127, and local area network (LAN) interface 123. Processor 103 and its associated components may allow the computing device 101 to run a series of computer readable instructions related to receiving, storing, generating, calculating, identifying, and analyzing data to generate a risk map. Computing system 100 may also include optical scanners (not shown). Exemplary usages include scanning and converting paper documents, such as correspondence, data, and the like to digital files.

Computing device 101 may include a variety of computer-readable media. Computer-readable media may be any available media that may be accessed by computing device 101 and include both volatile and non-volatile media as well as removable and non-removable media. Computer-readable media may be implemented in any method or technology for storage of information such as computer-readable instructions, data structures, program modules, or other data. Computer-readable media include, but are not limited to, random access memory (RAM), read only memory (ROM), electronically erasable programmable read only memory (EEPROM), flash memory or other memory technology, or any other medium that can be used to store desired information that can be accessed by computing device 101. For example, computer-readable media may comprise a combination of computer storage media (including non-transitory computer-readable media) and communication media.

RAM 105 may include one or more applications representing the application data stored in RAM 105 while the computing device 101 is on and corresponding software applications (e.g., software tasks) are running on the computing device 101.

Input/output module 109 may include a sensor(s), a keypad, a touch screen, a microphone, and/or a stylus through which a user of computing device 101 may provide input, and may also include a speaker(s) for providing audio output and a video display device for providing textual, audiovisual, and/or graphical output.

Software may be stored within memory 115 and/or storage to provide instructions to processor 103 for enabling computing device 101 to perform various functions. For example, memory 115 may store software used by the computing device 101, such as an operation system 117, application program(s) 119, and an associated database 121. Also, some or all of the computer-executable instructions for computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices, mobile computing devices, or servers that include many or all of the elements described above about the computing device 101.

The network connections depicted in FIG. 1 include a local area network (LAN) 125 and a wide area network (WAN) 129, but may also include another type of network. When used in a LAN networking environment, computing device (e.g., in some instances a server) 101 may be connected to the LAN 125 through a network interface (e.g. LAN interface 123) or adapter in the communications module 109. When used in a WAN networking environment, the computing 101 may include a modem 127 or other means for establishing communications over the WAN 129, such as the Internet 131 or another type of computer network. It will be appreciated that the network connections shown are illustrative, and other means of establishing a communications link between the computing devices may be used. Various well-known protocols such as TCP/IP, Ethernet, FTP, HTTP and the like may be used, and the system may be operated in a client-server configuration to permit a user to retrieve a web page from a web-based server. Further, various conventional web browsers may be used to display and manipulate web pages.

Various aspects described herein may be embodied as a method, a data processing system, or as a computer-readable medium storing computer-executable instructions. For example, a computer-readable medium may store instructions to cause a processor 103 to perform steps of methods described herein. Such a processor 103 may execute computer-executable instructions stored on a computer-readable medium.

Figure 2:
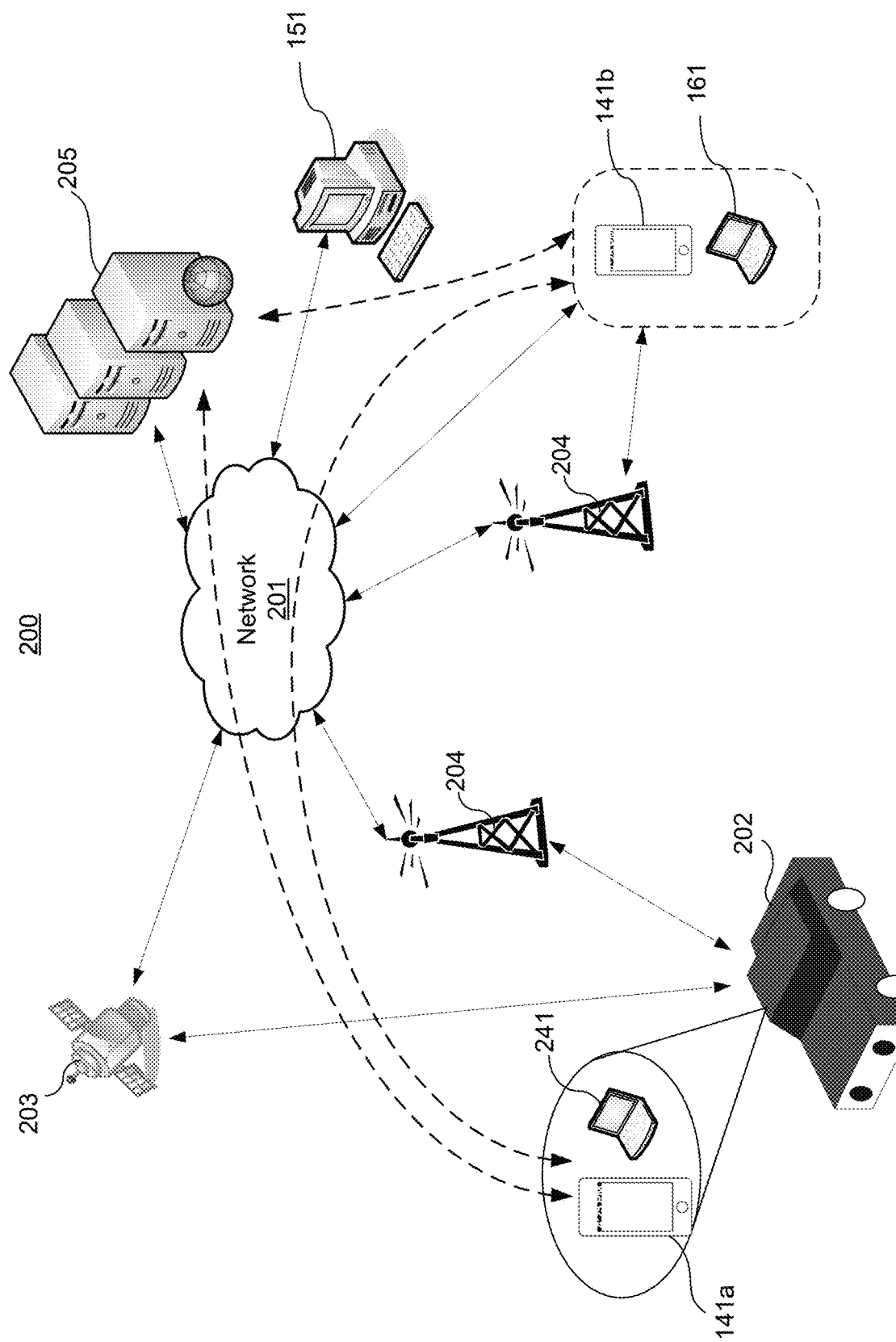
FIG. 2 illustrates an example operating environment in accordance with aspects of the present disclosure.

FIG. 2 illustrates an example network environment 200 for implementing methods according to the present disclosure. As shown in FIG. 2, the network environment 200 may include a network 201 configured to connect computing devices within or associated with a vehicle 202 (e.g., mobile computing device 141a or vehicle computing device 241), satellites 203, cellular network elements 204 (e.g., cell towers), one or more computing devices (e.g., 141b, 151, 161), and one or more application servers 205. Collectively, one or more of these computing devices may form a vehicle telematics management system. In some aspects, a mobile computing device 141a and a vehicle computing device 241 may be used interchangeably or may complete similar or identical functions or tasks. In describing different features of the present invention either the mobile computing device 141a or the vehicle computing device 241 may be referred to, however, it should be noted that any time that only one of these devices is described, the described device could be interchanged with the other device.

The network 201 may be any type of network, like the Internet 131 described above, and use one or more communication protocols (e.g., protocols for the Internet (IP), Bluetooth, cellular communications, satellite communications, etc.) to connect computing devices and servers within the network environment 200 so they may send and receive communications (e.g., notifications shown as dashed arrows) between each other. In particular, the network 201 may include a cellular network and its components, such as base stations. Accordingly, for example, a mobile computing device 141a (e.g., a smartphone) of a driver or passenger in a vehicle 202 may communicate, via a cellular backhaul of the network 201, with an application server 205 which in turn may communicate, via the cellular backhaul of the network 201, with computing devices or application servers (e.g., 141b, 151, 161, and 205) to provide notifications. While FIG. 2 depicts arrows pointing to the vehicle 202, it should be understood that the connections may be made with a mobile computing device 141a and/or a vehicle computing device 241 within the vehicle 202. For example, the mobile computing device 141a and/or the vehicle computing device 241 may communicate with a satellite 203 to obtain GPS coordinates or to transfer notifications to the network 201 through the satellite 203. Further, it should be understood that the mobile computing device 141a (e.g., a smartphone) may connect to the network 201 even if it is removed from the vehicle 202.

FIG. 2 illustrates only one vehicle 202. However, the vehicle telematics management system may be configured to communicate with multiple vehicles 202 simultaneously. Also, although FIG. 2 depicts the vehicle 202 as a car, the vehicle 202 may be any type of vehicle, including a motorcycle, bicycle, scooter, drone (or other automated device), truck, bus, boat, plane, helicopter, etc. FIG. 2 also illustrates an example subsystem within the network environment 200. Specifically, FIG. 2 illustrates an example arrangement of computing devices that may exist within the vehicle 202 (and other vehicles not shown). To depict these computing devices, FIG. 2 includes a view of the inside of the vehicle 202. As shown in FIG. 2, the vehicle 202 may include a mobile computing device 141a and/or a vehicle computing device 241. In some embodiments, the mobile computing device 141a and the vehicle computing device 241 may communicate with one another (e.g., via BLUETOOTH). The mobile computing device 141a may be any mobile computing device (e.g., a smartphone, tablet, etc.) that is associated with a driver, passenger, or user of the vehicle 202. The mobile computing device 141a, the vehicle computing device 241, and other devices and servers (e.g., 141b, 151, 161, and 205) may be configured in a similar manner to the computing device 101 of FIG. 1.

Further, the mobile computing device 141a and/or the vehicle computing device 241 may be configured to execute a mobile device program that provides computer-executable instructions for collecting and communicating vehicle telematics data. Also, the mobile computing device 141a and/or the vehicle computing device 241 may include a user interface for a user to provide inputs to and receive outputs from the vehicle telematics management system. Such a mobile device program may be downloaded or otherwise installed onto the mobile computing device 141a and/or the vehicle computing device 241 using known methods. Once installed onto the mobile computing device 141a and/or the vehicle computing device 241, a user may launch the mobile device program by, for example, operating buttons or a touchscreen on the mobile computing device 141a and/or the vehicle computing device 241. Additionally, or alternatively, the mobile computing device 141a and/or the vehicle computing device 241 may be configured to execute a web browser (e.g., an application for accessing and navigating the Internet) to access a webpage providing an interface for the vehicle telematics management system.

In some embodiments, a mobile computing device 141a or a vehicle computing device 241 may also be configured to collect drive data using, e.g., an accelerometer, GPS, gyroscope, etc. of the mobile computing device 141a and/or the vehicle computing device 241. Drive data may include vehicle telematics data or any other data related to events occurring during a vehicle's trip (e.g., an impact to a part of the vehicle, a deployed airbag, etc.). For example, drive data may include location information, such as GPS coordinates, indicating the geographical location of the mobile computing device 141a as well as speed and acceleration data that may be used to detect speeding, cornering and hard-braking events. The mobile computing device 141a may be further configured to evaluate the drive data and to send notifications to the vehicle telematics management system (e.g., application servers 205, computing devices 141b, 151, 161, etc.). Further, the mobile computing devices 141a may send notifications to specific computing devices or servers belonging to insurance providers interested in monitoring (or tracking) users of the mobile computing device 141a. As such, for example, an insurance provider via servers or computing devices (e.g., 151, 205, etc.) may monitor the driving behavior of a driver of a vehicle 202 based on notifications sent from the driver's mobile computing device 141a. Also, the vehicle telematics management system may allow insurance providers to monitor driving behavior of others too. The mobile computing device 141a might not necessarily be associated with (e.g., belong to) the driver, and instead, may be associated with a passenger.

Although FIG. 2 depicts just one mobile computing device 141a within the vehicle 202, the vehicle 202 may contain more or fewer mobile computing devices 141a in some cases. For example, the vehicle 202 may carry one or more passengers in addition to the driver, and each person may have one or more mobile computing devices 141a. Or, for example, the people in the vehicle 202 might not have a mobile computing device 141a or might have left their mobile computing device 141a elsewhere. In such cases, where the vehicle 202 does not contain a mobile computing device 141a, an insurance provider may monitor the vehicle 202 based on notifications received from the vehicle computing device 241 within the vehicle 202.

A mobile computing device 141a and/or a vehicle computing device 241 may communicate notifications (see dashed arrows) to one or more insurance provider computing devices. The notifications may be transmitted directly from a mobile computing device 141a or a vehicle computing device 241 to an insurance provider's computing device (e.g., 141b, 151, 161, etc.) or indirectly through, e.g., an application server 205 (e.g., a notification may be transmitted to an application server 205, which in turn may transmit a notification to the appropriate computing device 151).

A computing device operated by an insurance provider may be configured to execute an insurance device program that provides computer-executable instructions for establishing restrictions and other conditions for triggering alerts based on vehicle telematics data. The insurance device program may also provide computer-executable instructions for receiving notifications from mobile computing devices 141a and communicating parameter changes and other messages to mobile computing devices 141a. The insurance device program may also provide a user interface for an insurance provider to provide inputs to and receive outputs from the vehicle telematics management system. The insurance device program may be downloaded or otherwise installed onto a computing device operated by an insurance provider using known methods. Once installed onto the computing device, a user may launch the insurance device program by, for example, operating buttons or a touchscreen on the computing device. Additionally, or alternatively, the computing device operated by the insurance company may be configured to execute a web browser (e.g., an application for accessing and navigating the Internet) to access a web page providing an interface for the vehicle telematics management system.

Still referring to FIG. 2, as described above, the vehicle 202 may also include a vehicle computing device 241. The vehicle computing device 241 may be configured in a similar manner to the computing device 101 of FIG. 1. Further, the vehicle computing device 241 may be configured to execute the mobile device program in addition to, or instead of, the mobile computing device 141a. In some cases, the vehicle computing device 241 and the mobile computing device 141a may operate in conjunction so that the vehicle computing device 241 performs some modules of the mobile device program while the mobile computing device 141a performs other modules of the mobile device program. For example, the vehicle computing device may collect drive data (e.g., vehicle telematics data) and communicate the drive data, via a wired (e.g., USB) or wireless (e.g., BLUETOOTH) connection, to a mobile computing device 141a within the same vehicle 202 so that the mobile computing device 141a may evaluate the drive data and/or send notifications (providing evaluated drive data and/or raw drive data).

Further, the vehicle computing device 241 may be configured to connect to one or more devices (e.g., a GPS, sensors, etc.) installed on the vehicle 202 to collect the drive data. In some embodiments, the vehicle computing device 241 may be a system including multiple devices. For example, the vehicle computing device 241 may include the vehicle's on-board diagnostic (OBD) system. The vehicle computing device 241 may be configured to interface with one or more vehicle sensors (e.g., fuel gauge, tire pressure sensors, engine temperature sensors, etc.). The vehicle computing device may be configured to communicate directly or indirectly (e.g., through a mobile computing device 141a) with the vehicle telematics management system. In some embodiments, there might not be a vehicle computing device 241 installed on the vehicle 202 that is configurable to interface with the vehicle telematics management system, or the vehicle computing device 241 might not be able to communicate with a mobile computing device 141a.

An autonomously controlled vehicle 202 may be controlled by its vehicle computing device 241 and/or a remote computing device (not shown) via the network 201 or another network. The vehicle computing device 241 may employ sensors for inputting information related to a vehicle's surroundings (e.g., distance from nearby objects) and use the inputted information to control components of the vehicle 202 to drive the vehicle 202.

FIG. 2 further illustrates that the vehicle telematics management system may include one or more application servers 205. The application servers 205 may be configured to receive notifications (which may include the raw vehicle telematics data or information indicating driving events) from mobile computing devices 141a and process the notifications to determine if conditions are met (e.g., whether insurance provider restrictions have been violated). The application servers 205 may include one or more databases for associating one or more mobile computing devices 141a or one or more vehicle computing devices 241.

Figure 3:
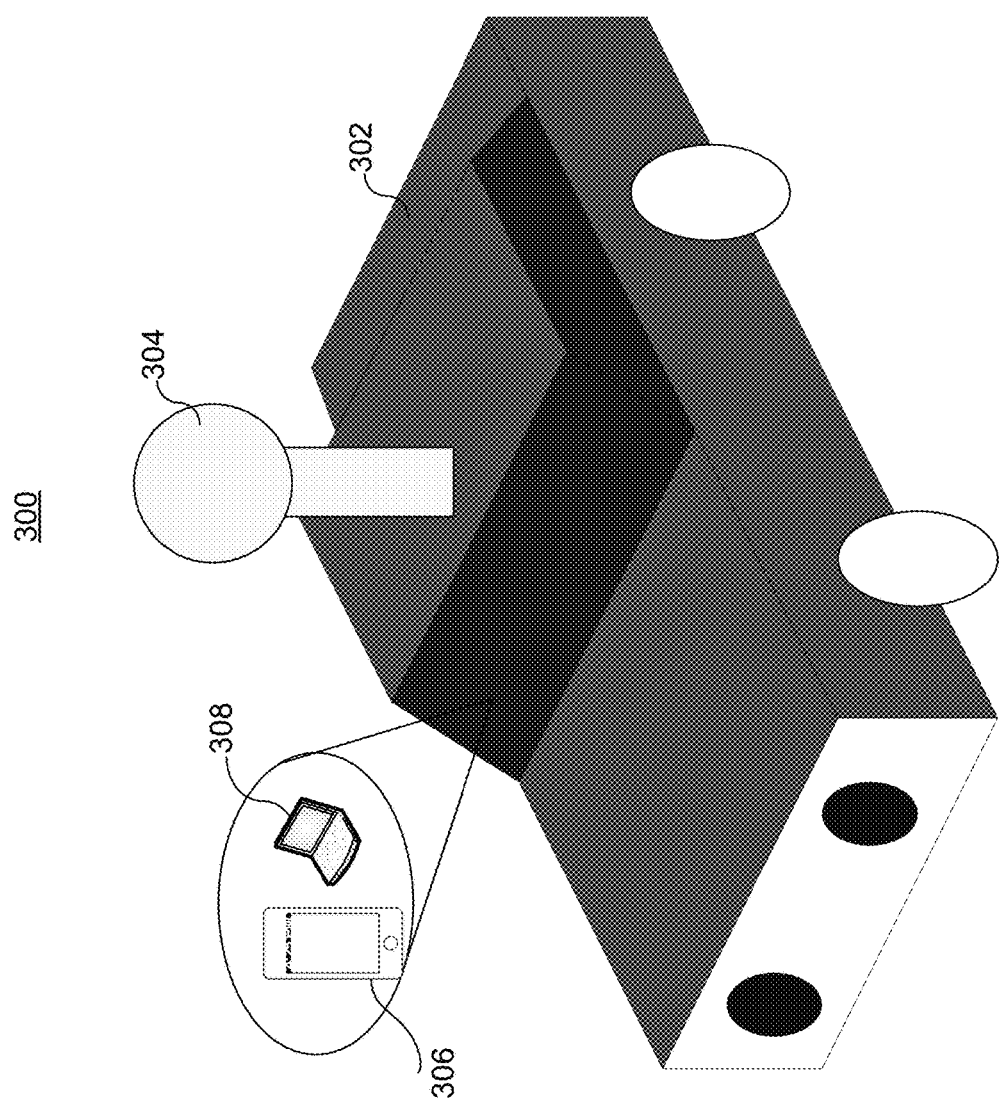
FIG. 3 depicts an example of a sensor coupled to a vehicle in accordance with aspects of the present disclosure.

FIG. 3 illustrates an example system in which a sensor 304 may be coupled to a vehicle 302. A vehicle 302 may be similar to a vehicle 202 as shown in FIG. 2. In some examples, a plurality of sensors 304 may be used. The sensor 304 may be coupled to a vehicle 302 in the arrangement shown in FIG. 3, or in other various arrangements (not shown). In some embodiments, a sensor 304 may be located inside, outside, on the front, on the rear/back, on the top, on the bottom, and/or on each side of the vehicle 302. In some cases, the number of sensors 304 used and positioning of the sensors 304 may depend on the vehicle 302, so that sensor information for all areas surrounding the vehicle 302 may be collected.

A sensor 304 may gather or detect sensor information. The sensor information may comprise data that represents the external surroundings of the vehicle 302. In some examples, the sensor information may include data that represents the vehicle 302 so that the vehicle's shape and size may be determined from such data. The sensor 304 may comprise a light detection and ranging (LIDAR) sensor, a radar sensor, a sound navigation and ranging (SONAR) sensor, a camera or other video/image recording sensor, a light sensor, a thermal sensor, an optical sensor, an acceleration sensor, a vibration sensor, a motion sensor, a global positioning system receiver or other position sensor, a point cloud sensor (e.g., for obtaining data to generate a point cloud figure/object/image/etc.), a technology (e.g., sensing device or scanner) used to sense and detect the characteristics of the sensing device's surroundings and/or environment, and the like. In some embodiments, there may be a plurality of sensors 304 (not shown), and each sensor of the plurality may be the same type of sensor or may comprise a combination of different sensors. For example, one sensor may be a LIDAR sensor, and another sensor may be a camera. In some examples, the sensor 304 may be specially designed to combine multiple technologies (e.g., a sensor 304 may include accelerometer and LIDAR components).

The system (e.g., computing devices 306 and 308, sensor 304, etc.) may gather additional information, such as environmental information, road information (e.g., road attribute data), vehicle information, weather information, traffic information, geographic location information, accident information, etc. Environmental information may comprise data about the surroundings of the vehicle 302. In some embodiments, the environmental information may comprise road, weather, and geographic information. For example, environmental information may comprise data about the type of route the vehicle 302 is traveling along (e.g., if the route is rural, city, residential, etc.). In another example, the environmental information may include data identifying the surroundings relative to the road being traveled by the vehicle 302 (e.g., animals, businesses, schools, houses, playgrounds, parks, etc.). As another example, the environmental information may include data detailing foot traffic and other types of traffic (e.g. pedestrians, cyclists, motorcyclists, and the like).

Road information (e.g. road attribute data) may comprise data about the physical attributes of the road (e.g., slope, pitch, surface type, grade, number of lanes, traffic signals and signs and the like). In some aspects, the road information may indicate the presence of other physical attributes of the road, such as a pothole(s), a slit(s), an oil slick(s), a speed bump(s), an elevation(s) or unevenness (e.g., if one lane of road is higher than the other, which often occurs when road work is being done), etc. In some embodiments, road information may comprise the physical conditions of the road (e.g., flooded, wet, slick, icy, plowed, not plowed/snow covered, etc.). In some instances, road information may be data from a sensor that gathers and/or analyzes some, most, or all vertical changes in a road. In other examples, road information may include information about characteristics corresponding to the rules of the road or descriptions of the road: posted speed limit, construction area indicator (e.g., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of roads/lanes, population density, condition of road (e.g., new, worn, severely damaged with sink-holes, severely damaged by erosion, gravel, dirt, paved, etc.), wildlife area, state, county, and/or municipality. In some embodiments, road information may include data about infrastructure features of the road. For example, infrastructure features may include intersections, bridges, tunnels, railroad crossings, and other roadway features.

In some aspects, road information may include a large number (e.g., 300) attributes or more for each road segment. Each road may include one or more road segments, and different roads may include a different number of road segments. Also, road segments may vary in length. In some embodiments, road segments may be determined based on the attributes. These attributes may be obtained from a database or via a sensor. In some cases, the attributes of each road segment may be geocoded to a specific road segment or a specific latitude and longitude. For example, the attributes may be things such as, but not limited to, road geometry, addresses, turn and speed restrictions, physical barriers and gates, one-way streets, restricted access and relative road heights, etc. As another example, the road attribute data may consist of information identifying that a road segment has a curvature of 6 degrees.

In some aspects, road information may consist of volume data. Volume data may be information about how many cars travel over a road segment in a given time period. Volume data may also be obtained from a database or from a sensor. In some embodiments, the volume data may include information about the number of accidents per road segment, and/or the number of accidents per road segment in a given period of time. In some aspects, road information may include the flow of traffic in both historical patterns and in real time. In some aspects, road information may include claims data. For example, the claims data may be stored and obtained from a database and include information or be based from the first notice of loss. The claim data may be geocoded to a specific latitude and longitude of a road segment and may include directionality.

In some aspects, road information may include traffic data/traffic information. For example, traffic information may be information regarding traffic flows, jams, route closures, street/road closures, lane closures, and the like. Traffic information may include traffic reports, which may be distributed in real-time, about congestion, detours, accidents, etc. In some embodiments, a risk map may receive or gather information from numerous traffic cameras along a route a vehicle is traveling to determine the quickest most time efficient route to travel to a destination. In some instances, traffic information may refer to real-time roadway speeds, which are indicative of the amount of congestion and activity on the roadway. In some aspects, the risk map may gather traffic conditions from other computing devices and/or applications, for example HERE, to get information such as actual speed on the road and other variables. The risk map may then use this obtained information to help estimate risk on the road.

Weather information may comprise data about the weather conditions relative to a vehicle's 302 location (e.g., snowing, raining, windy, sunny, dusk, dark, etc.). In some aspects, weather information may include a forecast of potential weather conditions for a road segment being traveled by vehicle 302. For example, weather information may include a storm warning, a tornado warning, a flood warning, a hurricane warning, etc. In some aspects, weather information may provide data about road segments affected by weather conditions. For example, weather information may detail which roads are flooded, icy, slick, snow-covered, plowed, or closed. As another example, the weather information may include data about glare, fog, and the like.

Vehicle information may comprise data about how the vehicle 302 is operated (e.g., driving behavior). In some embodiments, a vehicle telematics device or on-board diagnostic (OBD) system may be used to gather information about the operation of a vehicle. For example, the vehicle telematics device may gather data about the braking, accelerating, speeding, and turning of a vehicle 302. In some aspects, vehicle information may comprise accident information (which will be described later). For example, vehicle information may include data that describes incidents (e.g., vehicle accidents) and a particular location where the incident occurred (e.g., geographic coordinates associated with a road segment, intersection, etc.). In some aspects, vehicle information may include the vehicle make, vehicle model, vehicle year, and the like. In some instances, vehicle information may comprise data collected through one or more in-vehicle devices or systems such as an event data recorder (EDR), onboard diagnostic system, or global positioning satellite (GPS) device. Examples of information collected by such devices include speed at impact, brakes applied, throttle position, direction at impact, and the like. In some examples, vehicle information may also include information about the car such as lights on or off, windshield wipers off or on, blinkers used, antilock brakes engaged and user information (e.g., driver, passenger, and the like) associated with the vehicle 302.

In some aspects, user information may include data about a user's age, gender, marital status, occupation, blood alcohol level, credit score, eyesight (e.g., whether the user wears glasses and/or glasses prescription strength), height, and physical disability or impairment. In some instances, user information may include data about the user's distance from a destination, route of travel (e.g., start destination and end destination), and the like. In some embodiments, the user information may comprise data about the user's non-operation activities while operating a vehicle 302. For example, the data may comprise the user's mobile phone usage while operating the vehicle 302 (e.g., whether the user was talking on a mobile device, texting on a mobile device, searching on the internet on a mobile device, etc.), the number of occupants in the vehicle 302, the time of day the user was operating the vehicle 302, etc.

Geographic location information may comprise data about the physical location of a vehicle 302. For example, the geographic location information may comprise coordinates with the longitude and latitude of the vehicle 302, or a determination of the closest address to the actual location of the vehicle 302. In another example, the vehicle location data may comprise trip data indicating a route the vehicle 302 is traveling along. In some aspects, the geographic location information may also include information that describes the geographic boundaries, for example, of an intersection (e.g. where a vehicle 302 is located) which includes all information that is associated within a circular area defined by the coordinates of the center of the intersection and points within a specified radius of the center. In some embodiments, geographic location information may include numerous alternative routes a vehicle 302 may travel to reach a selected destination. In some aspects, any geographic location information may include any geocoded data about a road segment.

Accident information may comprise information about whether a vehicle 302 was in an accident. In some aspects, accident information may identify damaged parts of the vehicle 302 resulting from the accident. For example, accident information may detail that the front bumper, right door, and right front headlight of the vehicle 302 were damaged in an accident. In some examples, accident information may detail the cost of replacement or repair of each part damaged in an accident. In some instances, accident information may include previously described vehicle information. In some embodiments, accident information may include data about the location of the accident with respect to a road segment where the accident occurred. For example, accident information may include where the accident occurred on the road segment (e.g., which lane), the type of road the accident occurred on (e.g., highway, dirt, one-way, etc.), time of day the accident occurred (e.g., daytime, night time, rush hour, etc.), and the like. In some aspects, an accident (e.g., accident location) may be geocoded to a road segment.

Some additional examples of accident information may include loss type, applicable insurance coverage(s) (e.g., bodily injury, property damage, medical/personal injury protection, collision, comprehensive, rental reimbursement, towing), loss cost, number of distinct accidents for the road segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with a cyclist, collision with a pedestrian, collision with an animal, collision with a parked car, etc.), drugs or alcohol involved, pedestrian involved, wildlife involved, type of wildlife involved, speed of vehicle 302 at time of accident, direction the vehicle 302 is traveling immediately before the accident occurred, date of accident, time of day, night/day indicator (i.e., whether it was night or day at the time of the accident), temperature at time of accident, weather conditions at time of accident (e.g., sunny, downpour rain, light rain, snow, fog, ice, sleet, hail, wind, hurricane, etc.), road conditions at time of accident (e.g., wet pavement, dry pavement, etc.), and location (e.g., geographic coordinates, closest address, zip code, etc.) of the vehicle 302 at time of accident.

In some examples, accident information may be information related to emergency vehicles. This type or form of accident information may help emergency vehicles respond more quickly to accidents. In some aspects, using this type of accident information may help emergency responders to keep drivers safe. Emergency responders may be able to prepare for various types of accidents and determine the number of emergency vehicles needed at a particular accident. Examples of accident information that may help emergency vehicles include information regarding the fastest route to an accident, information regarding road closures, information regarding the type of accident (vehicle-vehicle collision, vehicle-pedestrian collision, etc.), number of people involved in the accident, and the like.

Accident information associated with vehicle accidents may be stored in a database format and may be compiled per road segment, route, and/or risk map. One skilled in the art will understand that the term road segment may be used to describe a stretch of road between two points as well as an intersection, roundabout, bridge, tunnel, ramp, parking lot, railroad crossing, or other feature that a vehicle 302 may encounter along a route. In some aspects, accident information may be geocoded to a specific latitude and longitude.

Any or all of the previously described information may be obtained from databases (e.g., received information or downloaded information) instead of being directly obtained from sensors. One or more databases may exist in the form of servers and/or computing devices, which may contain the different forms of information previously described (e.g., road information, accident information, vehicle information, environmental information, weather information, claim information, volume data, traffic information, etc.). This previously described information may be transmitted to or downloaded by a computing device, system, or used in a method to be manipulated and utilized as described by the disclosure herein.

The various forms of information previously described may enable a computing device or system to predict which road segments are most likely to have the most accidents. In some aspects, the information may be used to determine the riskiness of a road segment. Once a risky road segment is known or identified, the road attributes may be analyzed to determine if the road attributes have any correlation to the risky nature of the road segment. If the road attributes can be correlated to a risk or risk value, then the road segment attributes may be given a riskiness factor (e.g., a risk score or a road segment risk score). For example, if a road is elevated and/or rippled, the road segment containing the elevated and/or rippled road may be given a particular risk score (e.g., a road segment risk score) of 7.5 (out of 10, where 10 indicates the highest level of risk). In some instances, modifiers or indicators may identify or mark a road segment to identify a potential risk. For example, if a road segment has a steep slope and a weather condition is present that may affect the safety conditions of the road segment, then there may be a calculation or determination to modify the risk score of the road segment, and the road segment may be marked with an indicator, modifier, identifier or the like to represent this identified risk.

The way the received information may be combined and utilized may allow an insurance provider to determine a cost of insurance per trip based on the roads a vehicle 302 travels. The received information may also allow risk-informed routes to be generated. For example, a risk-informed route may let drivers or users know of dangerous areas (e.g., dangerous road segments), and send users updates as the risk of the road segments changes in value or in risk score. In some embodiments, the received information may be used to alert users that the user may be approaching a dangerous intersection and/or road segment, give users instructions on how to deal with the intersection or road segment, or interact with an autonomous car to control the way the autonomous car may be operated while traveling the intersection or road segment. In some aspects, the received information may be provided to a municipality in order to help them identify dangerous roads or roads that may need to be repaired. Providing the received information to the government may enable the government to alter dangerous roads or install warning signs. In some embodiments, the received information may be used to analyze a series of accidents and analyze the types of drives in the accidents, and/or specific conditions that occurred during the accident, which may generate a better analysis of the risk (e.g., older drivers may have a problem with unprotected left-hand turns). In other examples, the received information may be used to provide personalized alerts for different types of users and/or drivers. For example, different alerts for older drivers, teen drivers, drivers from other states, or even not to provide personalized alerts to a person who travels a road segment repeatedly.

In some aspects, a system or method may be used to determine routes a particular user travels, and to pre-select the least risky route for the particular user to travel. In some cases, the system or method may be used to provide recommendations for a safer route to travel based on analyzing the received information and creating historical pattern data. Historical pattern data may be information of routes and road segments a user commonly takes when travelling to certain locations or destinations. For example, if a user took a different highway entrance from the entrance the user typically takes, the risk may go down, e.g., 15%. This received information and historical pattern data may also be analyzed manipulated and provided to a company operating a fleet of vehicles (e.g., company with a fleet of delivery vehicles). For example, fleet companies may receive information about which routes their drivers should take based on which routes are safer, and which routes may lower their insurance premiums.

FIG. 3 illustrates computing devices 306 and 308, which may be similar to computing device 101. Computing devices 306 and/or 308 may be used for generating a risk map based on sensor information or received/downloaded information (e.g., information stored in databases) described above. For example, the computing devices 306 and/or 308 may receive sensor information from sensor(s) 304, and generate a risk map. In another example, the computing devices 306 and/or 308 may use received information received from databases (e.g., servers 205) to develop a risk map, and generate alerts that are included with the risk map that may help to alert a driver of potential risks. A risk (e.g., potential risk) may comprise anything that may create a dangerous driving condition or increase a likelihood of a vehicle 302 getting into an accident. A risk map may comprise an image (e.g., JPEG, TIFF, BMP, etc.), a video (e.g., MPEG), a graphics display (e.g. SVG), a hologram, or other visual outputs for illustrating a road segment or route being traveled by a vehicle 302. The risk map may further include markers or other indicators of risks (e.g. risk objects). Risks (e.g., risk objects) may be any item, event, or condition that may pose a danger to a vehicle 302, while the vehicle 302 is on a trip or being operated. In various embodiments, the risk map may be a multi-dimensional (e.g., two-dimensional (2D)) illustration. Further, in some embodiments, the risk map may dynamically change over time. The changes may be in accordance with geographic data indicating the vehicle's 302 location and/or other data (e.g., speed data indicating a speed of the vehicle 302 or odometer data indicating distance the vehicle 302 traveled). In some embodiments, the risk map may be keyed or coded (e.g., certain symbols, colors, and the like that represent different risks or categorize the risk objects within the risk map).

In some embodiments, computing devices 306 and/or 308 may create different risk maps for different users. For example, one risk map may be generated for a user of a vehicle 302, while a different risk map may be generated for a different user of another vehicle. The differences in the risk maps may depend on the past driving behavior of the different users (e.g., drivers) and may take into account that different things may pose different risks to different users. Although risk maps are often described herein as being displayed to drivers of a vehicle 302, it should be understood that risk maps may be generated for and displayed to pedestrians, joggers, runners, bike riders, motorcyclists, and the like. As another example, a risk map may be generated for a commercial truck driver. Under this example, different risk objects may be highlighted on the risk map such as known clearances, hanging power lines, and the like. In some embodiments, a risk map may be created for coordinating risk inside a building. For example, a risk map may be created to help a pedestrian navigate their way through a mall or an airport. In some instances, computing devices 306 and/or 308 may generate a risk map that includes risk objects based on historical data. Historical data may comprise information about the prevalence of risk objects on a particular road segment over a given period of time. For example, a risk map may include risk objects based on where future risk may be located based on historical data or where risk is historically located on a road segment. In some aspects, computing devices 306 and/or 308 may create a risk map based on pre-determined road segment information. For example, computing devices 306 and/or 308 may receive road segment information for a segment of road that the vehicle 302 is traveling on, and use the received road segment information to generate a risk map of the road segment. In some instances, computing devices 306 and/or 308 may receive one or more risk maps from another computing device, identify which particular risk map of the one or more risk maps matches the segment of road that the vehicle 302 may be traveling on, and generate a new risk map using the identified particular risk map along with sensor information obtained by the vehicle 302. In some embodiments, computing devices 306 and/or 308 may create a risk map based on risk (e.g., risk objects). In some aspects, computing devices 306 and/or 308 may create a risk map, which provides different routes to a user to mitigate risk. For example, a generated risk map may contain different routes of travel based on the road segments a user may travel to arrive at their end destination. Under this example, each route may correlate to a different risk score based on the number and the type of risk objects located on each route.

In some aspects, the computing devices 306 and/or 308 may display a risk map to a user. In some examples, the risk map may be displayed on the exterior of the vehicle 302 (e.g., on the hood of a vehicle 302), on the interior of the vehicle 302 (e.g., on a display device, LCD screen, LED screen, plasma screen, and the like), or on the windshield of the vehicle 302 (e.g., heads-up display [HUD]). In some embodiments, a risk map may be displayed as a hologram, or on augmented reality (AR) glasses, or the like.

The computing devices 306 and/or 308 may request or receive information from other computing devices (e.g., servers and databases) and sensors. For example, the computing devices 306 and/or 308 may receive sensor information from sensor(s) 304 and/or instructions/data/information from a user device or network device (not shown). The computing devices 306 and/or 308 may receive the different types of sensor information or receive the different types of information from a network server as those previously described. For example, the computing devices 306 and/or 308 may obtain environmental information, vehicle information, weather information, and the like. In some aspects, the computing devices 306 and/or 308 may receive and use the sensor information (e.g., x-plane information, y-plane information, and z-plane information) to determine whether a vehicle 302 is moving up or down.

The computing devices 306 and/or 308 may receive and store data and/or instructions from an insurance provider (via an insurance provider's server) on how to determine what poses a risk to a driver of a vehicle 302 (e.g. identify a risk object). In some instances, the computing devices 306 and/or 308 may determine a risk value or a risk score for a potential risk (e.g., risk object). For example, the computing devices 306 and/or 308 may evaluate a risk object and assign it a risk score. As another example, the computing devices 306 and/or 308 may assign a certain risk score to a road segment that is wet from rain, and assign a lower risk score to the road segment that is not wet from rain. In some embodiments, the computing devices 306 and/or 308 may calculate the risk score for a road segment, risk object, route, risk map, or point of risk by applying actuarial techniques. In some aspects, the computing devices 306 and/or 308 may determine how to identify or present a risk object to a driver. In some aspects, the computing devices 306 and/or 308 may process insurance policy information related to the user. For example, the computing devices 306 and/or 308 may update a user's insurance information, adjust the user's insurance premium, adjust the user's insurance coverage, file or submit a claim, calculate a user's insurance premium, or complete any other insurance task or process.

The computing devices 306 and/or 308 may generate an alert on the risk map to help the user identify an upcoming and potential risk(s) on their route of travel. In some aspects, the computing devices 306 and/or 308 may determine how to display a risk object to a user via the risk map. Risk objects may be displayed differently for different users depending on, for example, user preferences set by the user or demographic information. Also, a risk object may be displayed for one user, but not for another because different events, objects, etc. may pose risks to some but not to others. For example, a narrow bridge may be a risk for a novice driver, but not for an experienced driver who has driven over a narrow bridge many times before.

In some instances, the computing devices 306 and/or 308 may generate alerts that may be provided to a user about adjustments to their insurance premium or coverages. In some embodiments, the computing devices 306 and/or 308 may generate a cost of insurance per a trip. In some aspects, the computing devices 306 and/or 308 may develop risk values or risk scores, based on the received information. For example, a risk score may be a value associated with a particular road segment that is flat, and the risk score may be increased due to rain making the road wet. Under this example, the computing devices 306 and/or 308 may assign a new risk score to the road segment and notify the user that the risk score has changed. In some examples, a risk score may relate to a risk object being displayed in the risk map and the risk score may alter the presentation of the risk object within the risk map to indicate a certain level of risk associated with the risk object. For example, if there is a pothole on the road, the risk map may display the pothole in a particular color or the pothole may be blinking on the risk map. In some embodiments, a risk object may be enhanced with an indicator which may be associated with a risk ranking system. A risk ranking system may perform a method for prioritizing or labeling the different levels of risk or potential trouble/danger associated with a risk object.

In some aspects, the indicator may be a color, an animation, a sound, a vibration, and the like for indicating the level of risk associated with a risk object. For example, a pothole may be displayed in yellow if it is a moderate risk to a vehicle 302, or displayed in red if it is a severe risk to the vehicle 302. In another example, one sound may be played for a low risk while a different sound may be played for a high risk. In some examples, if a risk object is identified as being located on the left side of the vehicle 302, then a sound may play out of the left speaker(s) of the vehicle 302. In some examples, if a risk object is identified as being located on the right side of the vehicle 302, then a sound may play out of the right speaker(s) of the vehicle 302.

The computing devices 306 and/or 308 may organize and store all the information the computing devices 306 and/or 308 generate, transmit, and receive. In some aspects, the computing devices 306 and/or 308 may store risk maps. In some instances, the computing devices 306 and/or 308 may include a database for storing risk values/risk scores associated with risk objects or road segments, or for storing risk values, risk objects, or road segments. In some embodiments, the computing devices 306 and/or 308 may store routes (e.g., route information), risk objects (e.g., risk object information), and risk maps (e.g., risk map information) from other computing devices. In some cases, this stored information may be referred to as base map information. In some aspects, the computing devices 306 and/or 308 may transmit the risk map (and any other information generated or received by the computing devices 306, 308) to one or more databases or one or more servers for storage.

The computing devices 306 and/or 308 may develop a risk map. In some aspects, the computing devices 306 and/or 308 may output or display a risk map that may comprise information about the environmental surroundings of a vehicle 302 and the risks associated with the surroundings of the vehicle 302 as the vehicle 302 travels along a road segment. For example, the risk map may include the road a vehicle 302 is traveling on, along with the characteristics of the road, e.g., the trees, the buildings, and the weather conditions of the environment encompassing the road. In some embodiments, the computing devices 306 and/or 308 may retrieve GPS data and combine the GPS data with data from other engines and systems of the computing devices 306 and/or 308 to develop a risk map. In some embodiments, the risk map, that the computing devices 306 and/or 308 create, may not reflect reality (e.g., the risk map may be distorted). In some instances, the computing devices 306 and/or 308 may assemble a risk map that augments reality in order to show a visual representation of the vehicle's environment.

Figure 4B:
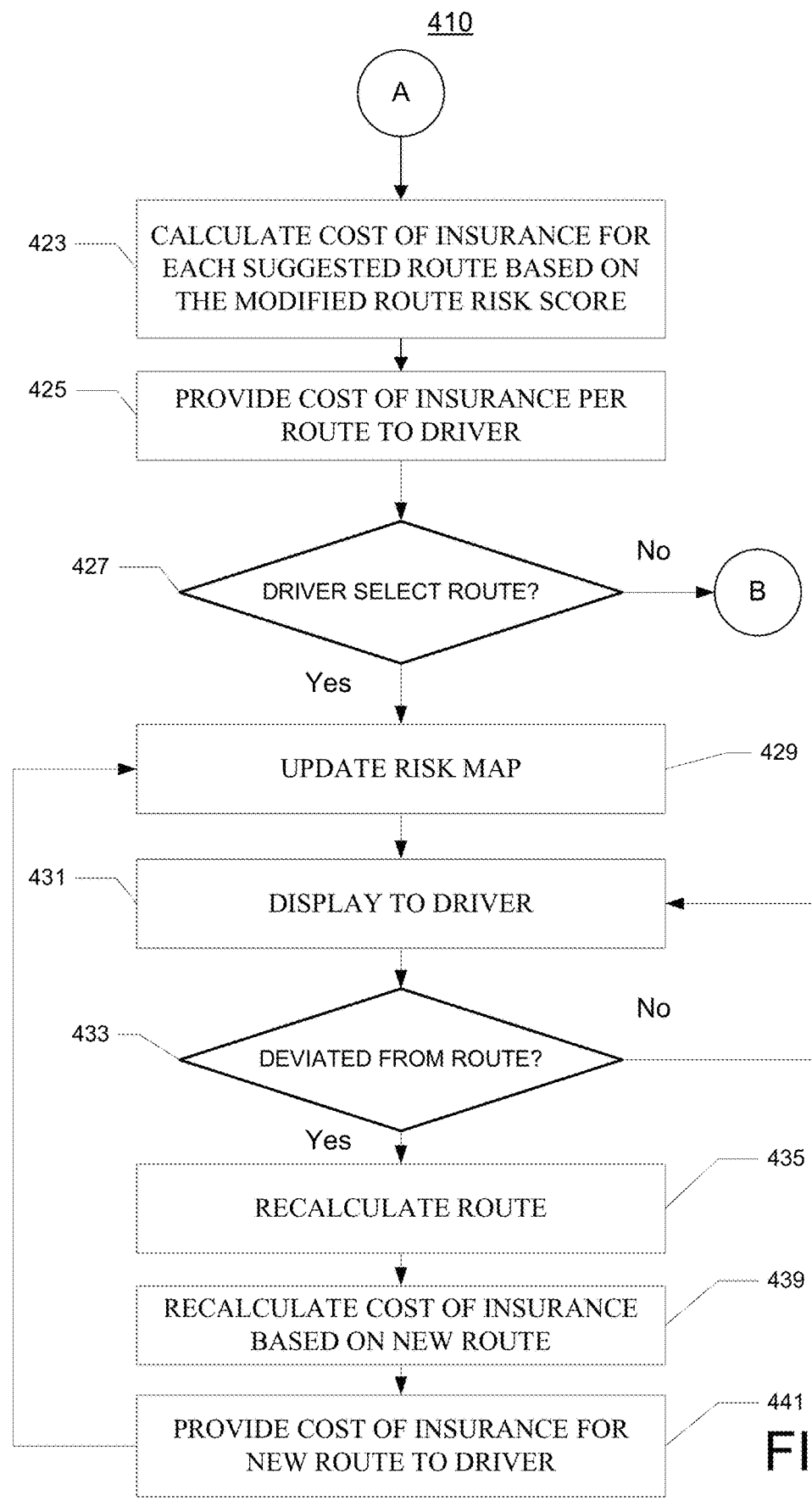

FIGS. 4A and 4B illustrate a method for generating a risk map and providing a user the cost of insurance per trip or selected route. The method may begin at step 401. At step 401, a computing device may receive a destination request. The destination request may contain information about a start and end location of a trip that a driver of the vehicle wishes to take. After receiving the destination request, the method may proceed to step 403.

At step 403, the computing device may receive road segment data or base map data (e.g., road segment information or base map information). The road segment data or base map data may be any data/information previously described. The computing device may download the road segment data or base map data from another device or database. In some embodiments, the computing device may receive the road segment data or base map data from sensors. The road segment data or base map data may be related to the destination request at step 403. The road segment data or the base map data may be of a route or a group of routes (e.g., a plurality of road segments) used to get the vehicle to the end destination of the destination request. In some embodiments, the base map data may comprise a plurality of road segments that may create a plurality of routes. In some examples, the base map data may include risk value or risk scores for each road segment (e.g., a road segment risk score) and/or a risk value or risk score for each route (e.g., a route risk score). After step 403 has completed, the method may proceed to step 405.

At step 405, the computing device may receive additional data. The additional data (additional information) may be any previously described information that may supplement the road segment data or base map data. For example, weather and/or traffic information may be additional data that may supplement the road segment data or base map data. In some aspects, the additional data may be any type of data previously described. After the computing device has received the additional data, the method may proceed to step 407.

At step 407, the computing device may generate a risk map with multiple route choices based on the road segment data and/or base map data. In some aspects, the risk map may be generated using the received additional data as well. The risk map may contain previously described alerts, modifiers, and/or identifiers for highlighting and representing risk objects. The generated risk map may include one or more routes a driver may use to travel to their end destination. The one or more routes may contain different risk objects and/or road segments from each other. The different routes may be generated based on different characteristics (e.g., using highways, side streets, rural roads, time-based, distanced based, etc.). After step 407, the method may proceed to step 411.

At step 411, the computing device may associate a stored risk value from the received road segment data and/or base map data (e.g., received information) to each road segment. Each road segment may have a pre-determined risk value assigned to it. In some aspects, the computing device may analyze the risk value for each road segment to create a road segment risk score for each road segment. In some embodiments, when a road segment does not have a risk value, the computing device may compare the road segment data for a particular road segment to road segment data for other similar road segments, and determine the appropriate risk value for the road segment based on the comparison. In some examples, the computing device may compare the road segment data for a particular road segment with a database of road segment data to determine a plurality of similar road segments, and then average the risk values of the plurality of similar road segments to determine the risk value and/or risk score for the particular road segment. In some aspects, associating the risk value may include analyzing the road segment a vehicle may travel along or through, and identifying one or more risk objects on the road segment. Once the one or more risk objects on the road segment have been identified, the computing device may analyze the characteristics of the one or more risk objects, and determine a risk value for each of the one or more risk objects. In some embodiments, once the one or more risk objects are identified, the computing system may receive a risk value for each of the one or more risk objects. After determining or receiving a risk value for the one or more risk objects, the computing device may calculate a risk score based on the number of risk objects, the characteristics of the one or more risk objects, and/or the risk value of the one or more risk objects located on the road segment. In some aspects, the computing device may have a list of pre-determined risk objects correlated to a pre-determine risk value. In some aspects, the computing device may have different groupings of risk objects (which may be categorized by the characteristics of the risk objects) correlated to pre-determined risk values. In some embodiments, a user may be able to determine, categorize, or correlate risk objects to a user selected risk score. In some embodiments, a specially configured or programmed server or computing device of an insurance provider that manages the computing system may rank, prioritize, or correlate the risk objects to a selected risk value. For example, all risk objects located on the side of the road may have a risk value of 10, while all risk objects located on the road may have a risk value of 20. In some aspects, the risk value assigned may represent the likelihood of a risk object causing an accident. For example, a pothole with a 2 ft diameter may get a higher risk value than a pot hole with a 1 ft diameter. Upon completion of step 411, the method may proceed to step 413.

At step 413, the computing device may combine the road segment risk score for each road segment to create a route risk score. Each route generated by the computing device may have its own individual route risk score, which may be created from the one or more road segments that may be combined to create that route. For example, the road segment risk scores for a route from step 411 may be combined to create a route risk score. After step 413, the method may proceed to step 415.

At step 415, the computing device may assemble the route risk scores into multivariable equations. For example, the computing device may use the data (identified at step 403) to determine a risk value of an object, or a road segment risk score or determine based on steps 411 and 413 a route risk score based on pre-determined equations. The equations may be configured for different information inputs which may affect the risk value and/or risk scores assigned to a risk object, road segment, and/or route. For example, one equation may use one of received information and sensor data while another equation may use a combination of both to determine a risk value and/or risk score. In some instances, a network device or insurance provider's server may generate and determine the multivariable equations. In some embodiments, the multivariable equations may be generated using actuarial techniques. Once the computing device assembles the received information into multivariable equations, the method may proceed to step 417.

At step 417, the computing device may calculate a modified road segment risk score based on applying the additional data. For example, the computing device may use the determined risk scores from step 411 and use the multivariable equation from step 415 to use the received additional data (e.g., geographic location information, weather information, and/or environmental information) to calculate a modified road segment risk score or scores. As another example, a risk score determined at step 411 may be adjusted. Under this example, the computing device may adjust a risk score due to a new condition (e.g. snow on the road). Due to the snow, the computing device may use the multivariable equation to determine that the previous risk score needs to be increased. Upon completion of step 417, the method may proceed to step 419.

At step 419, the computing device, based on the modified road segment risk scores generated at step 417, may generate updated/modified route risk scores. The modified route risk scores may use the modified road segment risk scores to determine new route risk score values. In some embodiments, a combination of modified road segment risk scores and road segment risk scores may be used to generate the modified route risk score. After step 419, the method may proceed to step 421.

At step 421, the computing device may store the modified road segment risk scores and modified route risk scores. In some aspects, the modified road risk scores may be correlated to mark or enhance a particular risk object, road segment, and/or risk map. The particular risk object, road segment, or route may be updated and assigned the new modified risk score. The updated risk object, road segment, or route with its updated risk score may be stored by the computing device into a database. In some aspects, the database information may be shared with other computing devices or be used to generate other risk maps with similar road segment or route characteristics. After step 421 is completed, the method may proceed to step 423.

At step 423, the computing device may calculate the cost of insurance for each suggested route based on the modified route risk score of each route. The cost of insurance may use the modified risk score to determine the potential risk objects and the likelihood of the vehicle or driver being at risk or an accident occurring. Once the cost of insurance for each route has been calculated, the risk map may proceed to step 425.

At step 425, the computing device may provide the cost of insurance per route to the driver. The computing device may transmit an alert (e.g., an email, pop-up, text message, voice message, and the like) to the driver via a mobile computing device or another computing device operated by a driver of the vehicle. Upon completion of step 425, the method may proceed to step 427.

At step 427, the driver (or user) may select a route. The computing device may determine if the driver has selected a route. The computing device may receive some form of an input at the computing device or from another device that contains the data as to whether or not a driver has selected a route. If the driver failed to select a route, the method may proceed to step 407. If it is determined that the driver did select a route, the method may proceed to step 429.

At step 429, the computing device may update the risk map with the selected route. The computing device may update the risk map by generating a new risk map, which may only contain information for displaying the selected route. After step 429, the method may proceed to step 431.

At step 431, the computing device may display the updated risk map to the driver. In some aspects, the computing device may transmit the updated risk map to the driver or to a display device in order for the risk map to be displayed. Upon completion of step 431, the method may continue to step 433.

At step 433, the computing device may determine whether or not the driver has deviated or changed from the selected route. The computing device may determine that a driver has deviated from the selected route based on the geographic coordinates of the vehicle. If the geographic coordinates do not align with coordinates of the selected route the computing device may determine the vehicle has left the selected route. In some embodiments, the computing device may receive information from a GPS device coupled to the vehicle, and using the GPS data, determine if the vehicle left the selected route. If the computing device determines the driver (more specifically the vehicle) has not deviated from the selected route, the method may return to step 431. If the computing device has determined that the driver (more specifically the vehicle) has deviated from the selected route, the method may proceed to step 435.

At step 435, the computing device may determine a new route and determine the road segments for the new route. The computing device may also determine the road segment risk scores and route risk score for the new route as previously described. Once the new route has been determined, and the new risk scores have been calculated, the method may proceed to step 439.

At step 439, the computing device may calculate the new cost of insurance of the new route the driver may be traveling. The computing device may determine the cost of insurance of the new route as previously described. In some aspects, the computing device may determine the cost of the previous route the driver has traveled (up until the point of deviation), and combine it with the cost of the new route the driver may travel to reach their destination. Once the new cost of insurance is determined, the new cost may be provided to the driver at step 441. For example, the computing device may transmit an email, alert, text message, voice message, notification, and the like to a device operated or controlled by the driver to provide the new cost to the driver. In some embodiments, the risk map may be used to calculate insurance cost. For example, the risk map may be used to track the route and number of miles a vehicle has traveled as well as the different roads and road conditions the vehicle has traveled while traveling those miles. This risk map may also be used to gather information about the amount of miles traveled and the road conditions of those miles to determine the cost of insurance. After step 441, the method may return to step 429 to update the risk map if necessary based on any changes to the environment and/or roadways.

Figure 5A:
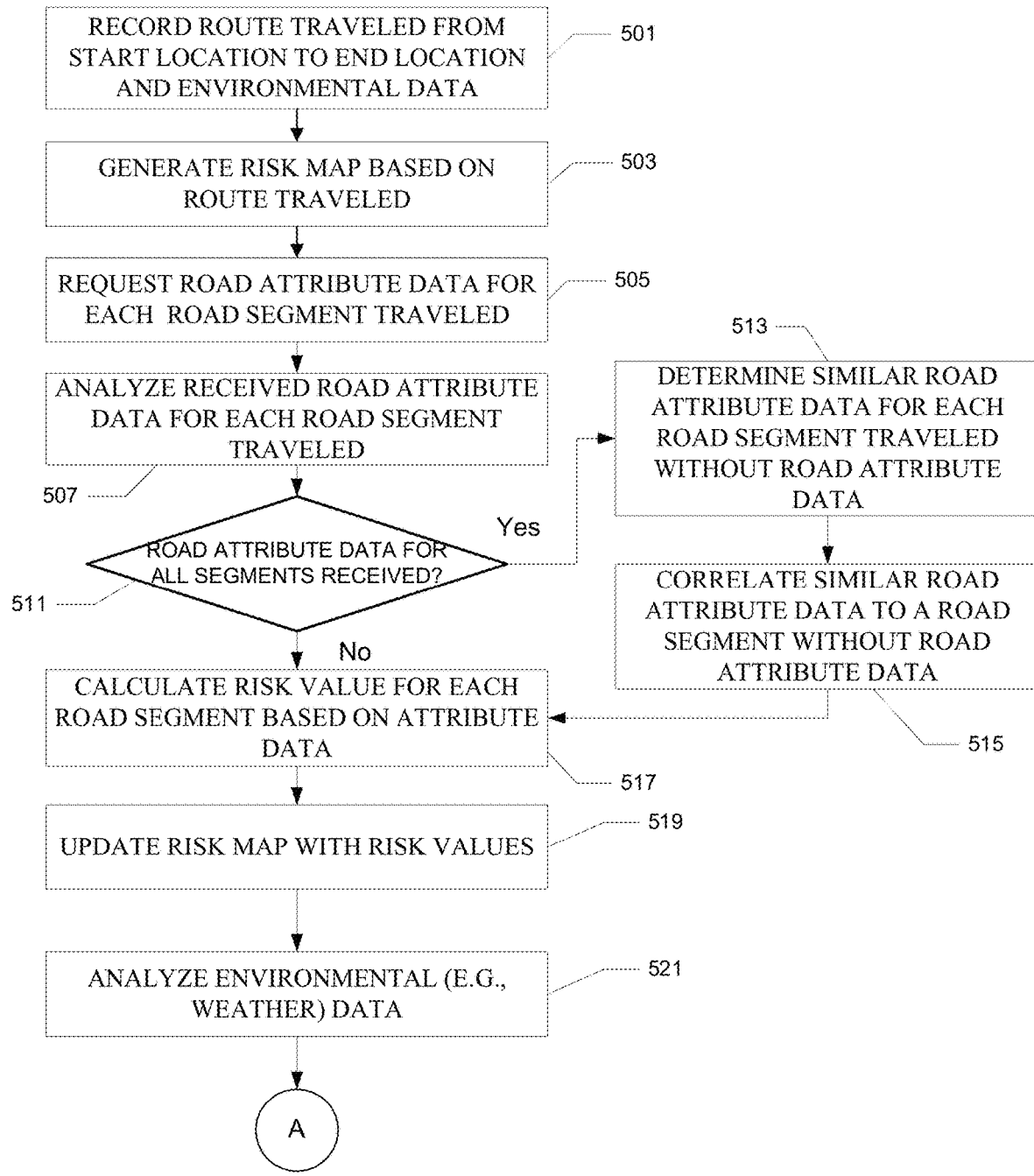
FIGS. 5A and 5B depict a flowchart of an example process in accordance with aspects of the present disclosure.
Figure 5B:
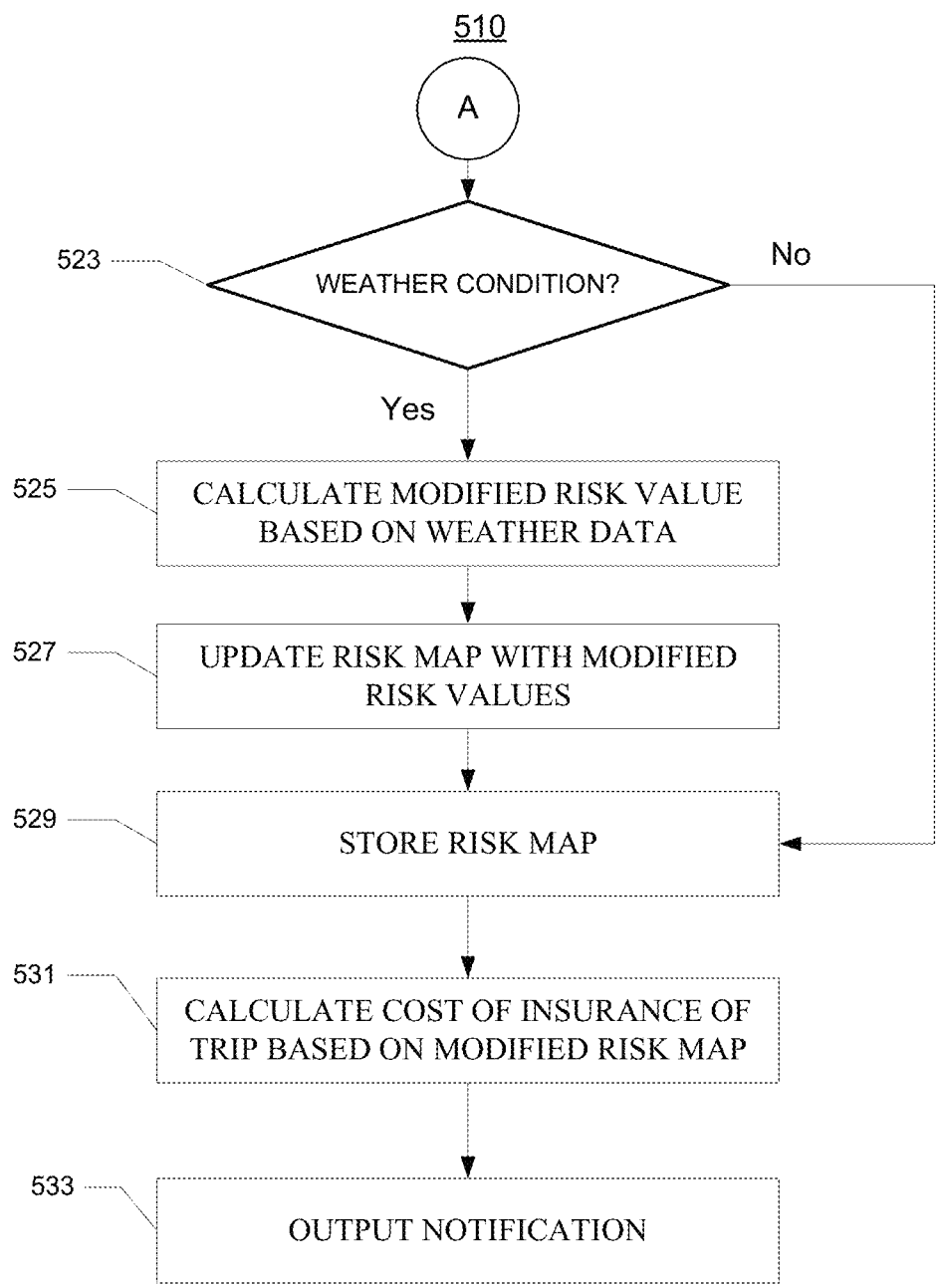

FIGS. 5A and 5B illustrate a method for generating a risk map and providing a user the cost of insurance based on the route of travel. The method may begin at step 501. At step 501, a computing device may record a route traveled by a vehicle from a start location to an end location, and may also record the weather data or other environmental data related to the route traveled. The computing device may communicate with a GPS device in order to obtain geographic information or the information (e.g., coordinates) relevant to tracking the vehicle to determine the route traveled. The weather data or other environmental data may be similar to the data/information previously described and may be obtained from other computing devices or servers. In some embodiments, the weather data or other environmental data may be obtained via one or more sensor attached to the vehicle. After step 501, the method may proceed to step 503.

At step 503, the computing device may generate a risk map based on the route traveled (e.g., determined at step 501). The risk map may be a risk map similar to any risk map previously described. The risk map may contain one or more road segments that make up the route, which was traveled by the vehicle. In some embodiments, step 503 may include breaking up the route recorded in step 501 into multiple road segments. Breaking up the route into various road segments may be performed based on road attribute information obtained from one or more databases (including third party databases, such as those created by parties that have taken on the arduous task of characterizing roads for a town, city, or other municipality.) In some instances, road segments may be created or devised using a map program (e.g., HERE Maps). For example, the road segments may be called Link_IDs. In some aspects, INRIX may supply volume data. Further, INRIX may use XD segments in order to create road segments. In some aspects, road segments may be created using a government standard/application called traffic message channel (TMC). After generating the risk map, the method may proceed to step 505. At step 505, the computing device may request information or data from another computing device or server for attribute data for each road segment that may create the route that was traveled by the vehicle. In some aspects, the computing device may request attribute data for each road segment in the risk map from a database, device, or server. Resulting from the request, the computing device may receive the attribute data for each road segment traveled by the vehicle. The computing device may receive the attribute data from another device, one or more servers, and/or one or more databases. Upon completion of this step, the method may proceed to step 507.

At step 507, the computing device may analyze the received road attribute data for each road segment traveled by the vehicle. The computing device may analyze the road attribute data for risk scores that identify the amount of risk correlated to each road segment. After step 507, the method may proceed to step 511.

At step 511, the computing device may determine whether road attribute data was received for each road segment that makes up the route that was traveled. In some instances, road attribute data may not exist for a road segment, because the road segment may have not been traveled before, may be new, may not have any attribute data calculated for it, etc. If the computing device determines that not all road attribute data was received for all road segments, the method may proceed to step 513. If the computing device determines road attribute data for all road segments was received, the method may proceed to step 517.

At step 513, the computing device may analyze and compare a road segment that does not have attribute data to a road segment with similar characteristics that has attribute data. For example, if a road segment without attribute data is a 4 lane highway, the computing device may identify other road segments that are 4 lane highways that have road attribute data. In some aspects, the computing device may look for as many similar attributes of the road segment lacking attribute data to match it to a similar road segment with attribute data. The road attributes (e.g., road characteristics) may be any of the previously described road attributes or characteristics. Obtaining attribute data may be completed as previously described with reference to FIGS. 4A and 4B. Upon completion of step 513, the method may proceed to step 515.

At step 515, the computing device may correlate the road attribute data of the identified similar road segment with road attribute data to the road segment without any road attribute data. In some aspects, there may be multiple similar road segments with attribute data, in this case, the computing device may select the road segment with the best fit or most similar road attributes. In some cases, the computing device may combine and average the road attribute data of the plurality of identified similar road segments to create the missing road attribute data. After step 515, the method may proceed to step 517.

At step 517, the computing device may calculate a risk value or risk score for each road segment based on the attribute data. The risk value or risk score may be calculated as previously described. After step 517, the method may proceed to step 519.

At step 519, the computing device may update the risk map may be with the risk values and/or risk scores. In some aspects, depending on the risk value certain road segments may have an identifier or modifier to highlight a risk object or a certain level of risk as previously described. After step 519, the method may proceed to step 521.

At step 521, the computing device may analyze environmental data, such as the weather data and/or traffic data (traffic information) obtained at step 501. For example, the computing device may determine what the weather conditions and/or traffic conditions were as the vehicle traveled the recorded route, or if there were any weather conditions and/or traffic conditions while the vehicle traveled the recorded route. The weather data may be similar to any previously described weather data. For example, the computing device may determine if it was raining, snowing, icy, snow covered road, slick road, wet road, sleet on road, blinding sun, etc., or any other type of weather condition that may affect a driver or vehicle as they traveled on the recorded route. The traffic data may be similar to any previously described traffic data or traffic information. For example, the computing device may determine the number of vehicles on the road, the type of vehicles on the road, the type of traffic (slow, fast, bumper to bumper, moving, stop and start, etc.), amount of delay, flow of traffic, heavy traffic, medium traffic, light traffic, and the like. Upon completion of step 521, the method may proceed to step 523.

At step 523, the computing device may determine if there was an influential or significant weather condition and/or traffic condition that should be considered for purposes of determining the level of risk of the route traveled and/or the cost of insurance for the route traveled. The computing device may determine if the weather data and/or traffic data (or traffic information) will enhance the risk value or risk score above a threshold. The threshold may be a value set to categorize if the weather creates an unsafe driving condition or increases the likelihood of an accident occurring. In some embodiments, the computing device may determine that a weather condition and/or traffic condition was present if the weather condition and/or traffic condition creates a weather risk value and/or traffic risk value over a threshold. If the weather and/or traffic risk value exceeds the threshold, then it may be determined that a weather condition and/or traffic condition is present and worth taking into consideration. If a weather condition and/or traffic condition is present, the method may proceed to step 525. If a weather condition and/or traffic condition is not present, the method may proceed to step 529.

At step 525, the computing device may calculate a modified risk value and/or risk score for the road segments based on the weather condition. The modified risk value and/or risk score may be calculated as previously described. After step 525, the method may proceed to step 527.

At step 527, the computing device may update the risk map with the modified risk values or risk scores as previously described. Upon completion of step 527, the method may proceed to step 529.

At step 529, the computing device may store the risk map and all information related to the risk map as previously described. Next, the method may proceed to step 531.

At step 531, the computing device may calculate the cost of insurance of the route traveled based on the modified risk map. The computing device may analyze the risk values and/or risk scores to determine the amount or premium for insurance a driver should be charged for the route the driver has driven. In some aspects, the risk values and/or risk scores of the road segments or the route may correlate to a monetary value, and the monetary values of each road segment that make up the traveled route may be combined to determine the cost of insurance for a trip. After step 531, the method may proceed to step 533.

At step 533, the computing system may output an alert or notification to a user identifying the cost of insurance for the trip. This may be similar to any previously described method of outputting an alert, risk map, or notification to a user or driver.

Figure 6:
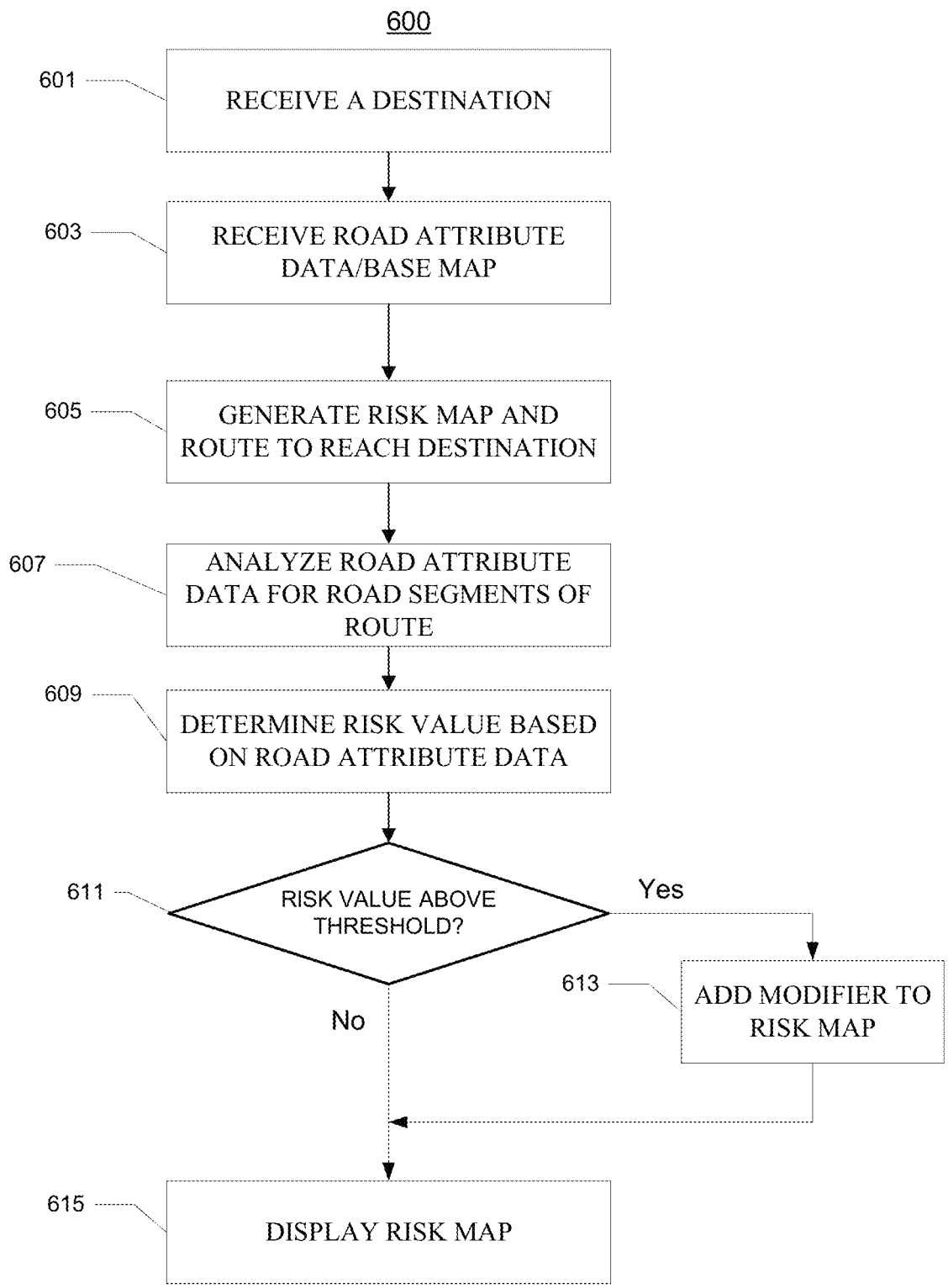
FIG. 6 depicts a flowchart of an example process in accordance with aspects of the present disclosure.

FIG. 6 illustrates a method for generating a risk map and providing an alert to a user. At step 601, a computing device may receive a destination from a driver of a vehicle. The computing device may determine a route of travel for the driver to follow to reach their desired destination. Upon completion of step 601, the method may continue to step 603.

At step 603, the computing device may receive road attribute data or base map data as previously described. After step 603, the method may move to step 605. At step 605, the computing device may generate a risk map or a route to reach the desired destination. The computing device may generate the risk map as previously described. Once step 605 has completed, the method may continue to step 607.

At step 607, the computing device may analyze the road attribute data as previously described. After step 607, the method may proceed to step 609. At step 609, the computing device may determine a risk value for the road segments and risk map as previously described. Upon completion of step 609, the method may proceed to step 611.

At step 611, the computing device may determine if the determined risk value is above a threshold. If the risk value is above a threshold, the method may proceed to step 613. If the risk value is below the threshold, the method may proceed to step 615. The threshold may be determined based on a user preference set by the user/driver or may be determined by an insurance provider (and different drivers may have different thresholds). The threshold may identify that a road segment contains (or is associated with) a risk object that may have a high probability of causing the vehicle the driver is driving to be in an accident.

At step 613, the computing device may add a modifier to a risk map which may identify a risk object. In some aspects, the computing device may add a modifier or an enhancement as previously described. After step 613, the method may proceed to step 615. At step 615, the computing device may display the risk map with the modifier as previously described.

In light of the present disclosure, it should be understood that steps may be added, omitted, or modified to the methods of the FIGS. 4A, 4B, 5A, 5B, and 6.

Figure 7A:
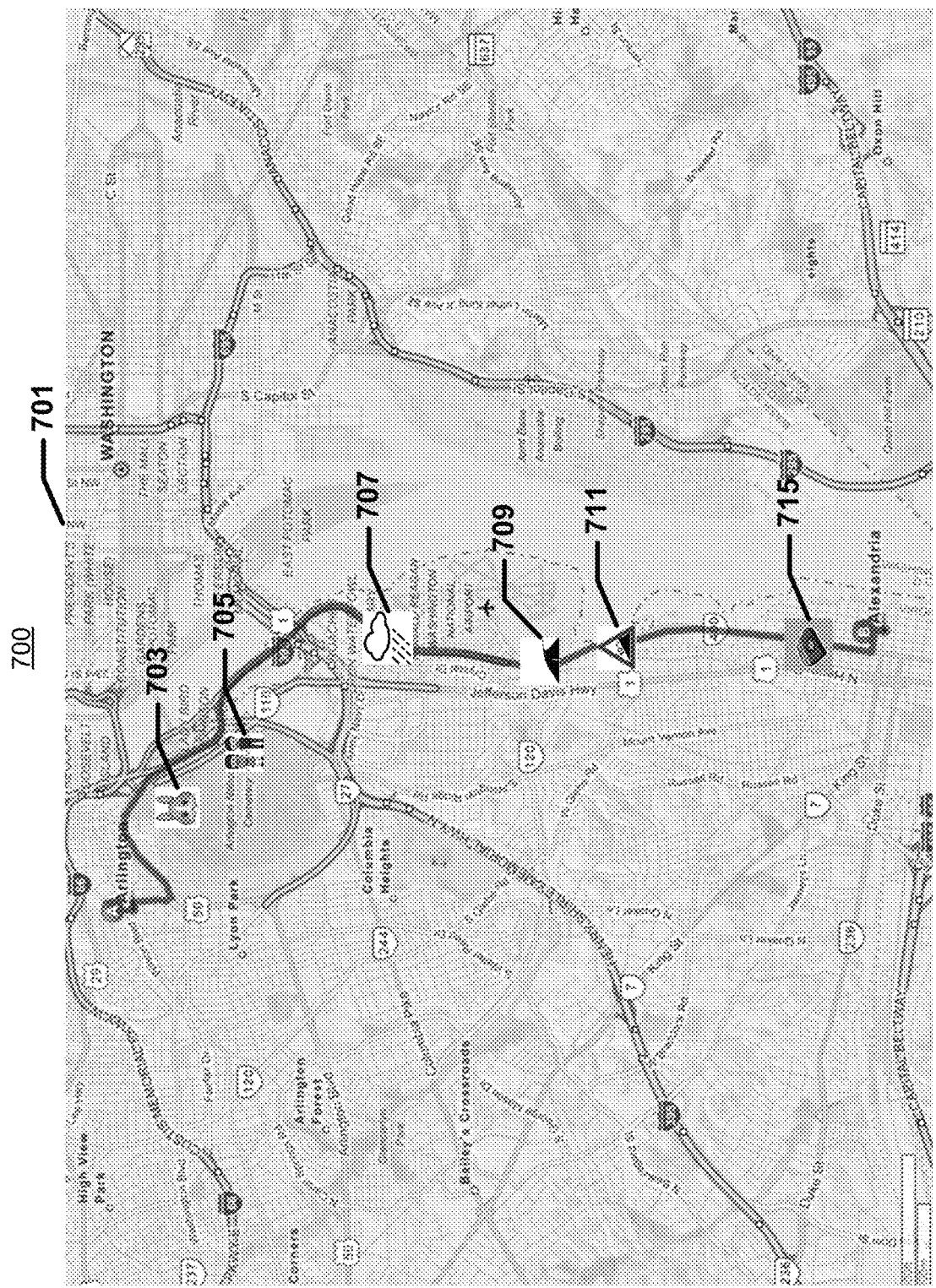
FIGS. 7A and 7B illustrate example interfaces in accordance with aspects of the present disclosure.

FIG. 7A illustrates an example risk map in accordance with the present disclosure. A user interface (e.g., monitor, touch-screen, etc.) 700 may display a risk map 701 to a user. As shown in FIG. 7A, the risk map 701 may include modifiers, indicator, or enhancements identifying potential risk objects or risks to a vehicle traveling a particular route. For example, A and B on the risk map 701 may designate a start location and an end location of a trip a driver may want to take. The route highlighted between location designation points A and B may be made up of one or more road segments. The risk map 701 may also include risk objects or risks along the route or road segments identifying potential risks to a driver traveling the selected route (e.g., risk objects 703, 705, 707, 709, 711, and 715).

Risk object 703 may be an indicator used to represent the risk of an animal becoming a potential hazard to the vehicle as it travels. Risk object 705 may be an indicator used to represent the risk of pedestrians becoming a potential hazard to the vehicle as it travels. Risk object 707 may represent rain or precipitation over a road segment. This may allow the driver to prepare for slick, wet, or flooded road conditions along that road segment. Risk object 709 may identify the driver of a potential curve in the road, or a curve that may be a blind curve or dangerous curve where a lot of accidents are known or expected to occur. Risk object 711 may represent to the driver that there is a 10% incline in the road segment. In some cases, this may identify that the road segment is abnormally steep and may be important information for a driver who may be operating a vehicle with bad or worn brakes. Risk object 715 may represent to the driver that the road segment has a pothole, which may cause damage to the vehicle if not avoided. Risk map 701 is one of many different possibilities of what a risk map may be displayed as. It should be understood that the risk map 701 may vary depending on the many different drivers, different routes, and/or different conditions. Moreover, because drivers, routes, and conditions may change, the risk map 701 may be dynamically updated. For example, if it stops raining before the driver reaches the road segment where a risk object 707 is located, then the risk object 707 may be removed. Alternatively, if the rain moves to a different area or another area of rain may affect the route, the risk object 707 may move to that different area on the risk map 701 or an additional risk object identical to or similar to (e.g., perhaps smaller if there is less rain) the risk object 707 may be added to the risk map 701. In some cases, where rain or another potential risk object moves and the risk map 701 includes a video file (e.g., MPEG file), the risk map 701 may show the corresponding risk object moving. For example, the risk map 701 may be animated to illustrate the risk object 707 moving over the risk map 701. Due to the dynamic nature of risk maps, it should be understood that there are an infinite number of risk maps and thus not all versions of the risk map 701 can be illustrated.

In some embodiments, the risk map may receive data from a vehicle to understand the severity of an accident and may be adjusted accordingly. For example, the risk map may indicate a high velocity accident so that a specialized emergency response team shows up to an accident site. In some examples, the risk map may include social components. For example, a social component to the risk map may indicate in real time when a new risk has occurred. As another example, the risk map may incorporate government data to indicate new problems and re-route the driver or user accordingly. In some instances, the risk map may be able to detect driver behavior (e.g., drowsy, angry, drunk, excitable, dangerous, erratic, and the like), adjust risk, and provide alerts accordingly. In some embodiments, the risk map may identify risk of certain autonomous cars (by maker) and alert that maker and those owners to software bugs.

Figure 7B:
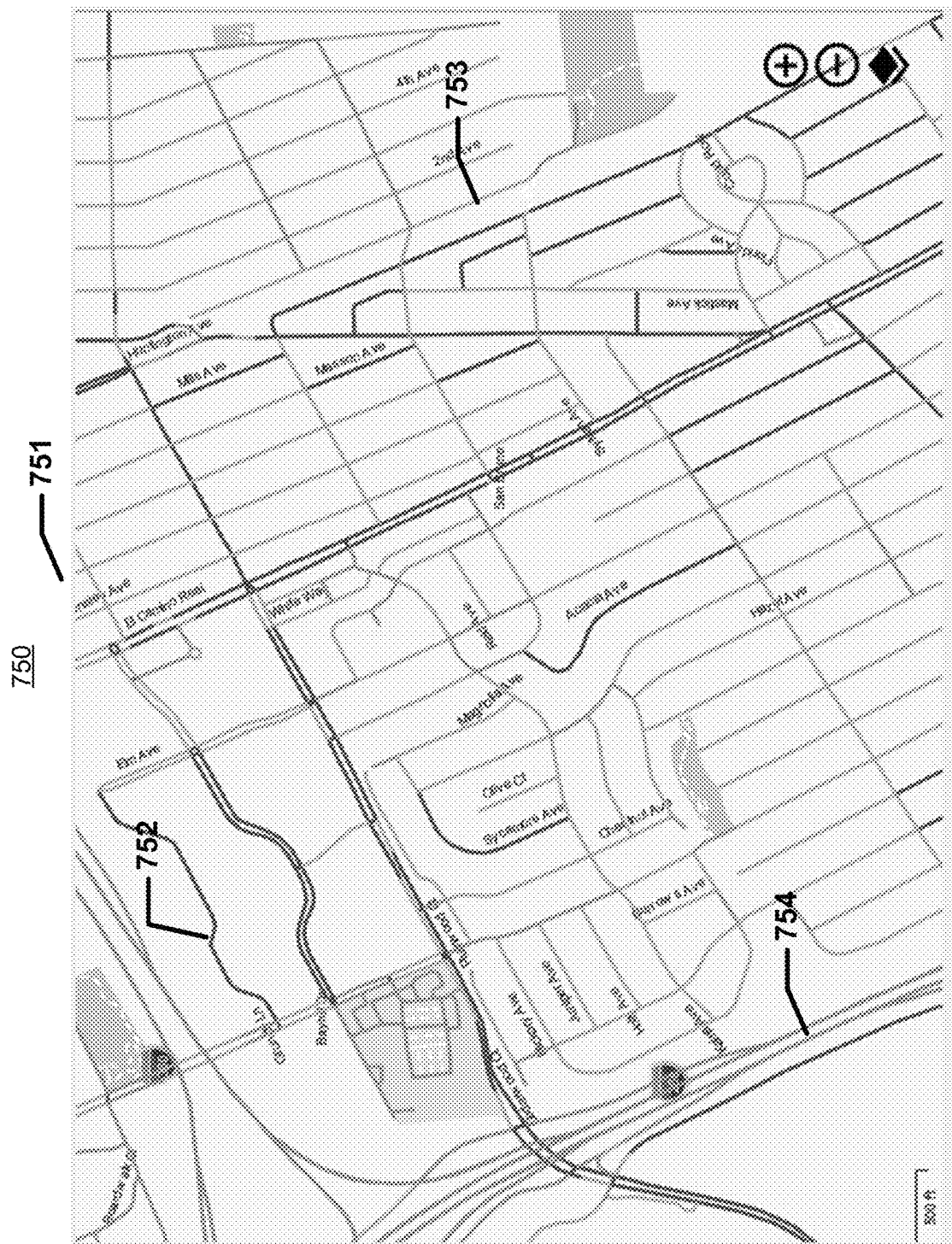

FIG. 7B illustrates an example risk map in accordance with the present disclosure. A user interface (e.g., monitor, touch-screen, etc.) 750 may display a risk map 751 to a user. As shown in FIG. 7B, the risk map 751 may include modifiers, indicators, or enhancements identifying potential risk objects or risks to a vehicle traveling a particular route. In some embodiments, the map may have an indicator, modifier, or enhancement for identifying traffic conditions on the routes and roads located near or around a vehicle as it travels to a destination. Road segment or route segment 752 may have an identifier (e.g., red color highlighting) marking it as a roadway that may contain high (or heavy) congestion (or traffic rate) or another high risk object (e.g., animal on the road, many pedestrians, flooding, etc.). The road speed on road segment 752 may be below a certain predetermined threshold (which may be specific to the specific road (e.g., main street) or specific to the type of road (e.g., residential road or highway)). The threshold may be set to a certain miles per hour for an average speed of a vehicle traveling along that particular road segment. Road segment or route segment 753 may have a different identifier (e.g., orange or yellow color highlighting) marking it as a roadway containing medium (or moderate) congestion (or traffic rate) or another medium risk object (e.g., animal on side of road, medium or average amount of pedestrians, minor flooding, etc.). In some aspects, the road speed on road segment 753 may be between two predetermined thresholds. Road segment or route segment 754 may have yet another identifier (e.g., green color highlighting) marking it as a roadway containing low or no congestion (or low or no traffic) or containing no risk objects or low risk objects (e.g., few pedestrians, no flooding, etc.). In some aspects, the road speed on road segment 754 may be above a predetermined threshold.

It should be understood that FIG. 7B shows an example view of the risk map 751, and that the user may select a desired view from a plurality of different views. The user may also choose which risks are identified or depicted on the risk map 751. In the example shown in FIG. 7B, the user has chosen to view traffic risks. In other embodiments, risk map 751 may have additional identifiers highlighting other risks and/or risk objects that may affect the user.

Additional aspects related to risk maps are further described below. As explained herein, risk maps may be formed from a plurality of interconnected road segments for which risk may be individually assessed. Roads may be segmented into road segments in various ways and to different degrees (e.g., a two lane road may be segmented into one road segment or two different road segments), and different types of information may be available for different road segments (e.g., traffic or weather information may be available for one road segment but not another). From the disclosure herein, it should be understood that where different lanes of a road are treated as different segments, the different lanes may be associated with different risks. For example, considering a three lane highway, a right lane may be less risky than a center lane which may be less risky than a left lane. Also, given a two lane road, traveling in one direction may be less risky than travelling in the opposite direction. As such, a driver driving in one lane may receive a risk map that is different than a risk map received by another driver in another lane of the same road. Also, in some examples, a driver driving in one lane may incur an insurance cost that is different than that incurred by another driver in another lane of the same road.

A system may determine the risk associated with each road segment in real time or near real time. The system may consider constants (e.g., road angle and whether segment is straight or curved) and variables (e.g., rain, time of day, whether road has ice) in determining the risk. The system may also include those devices (e.g., surveyor equipment, temperature sensors, etc.) used to measure such constants and variables.

In some examples, each segment of road has its own equation. The equation might not be the same for each road segment. In addition, the system may have or generate equations for calculating the risk associated with a particular human or a particular vehicle (e.g., car) in real time. The system again may consider constants (human gender, car make) and variables (time of day, wear on tires) in determining the risk associated with the human or the vehicle (e.g., car). The equations for risk for the road, the person/driver, and the vehicle may be interrelated.

The system may include a processor, associated with a specific road segment, configured or programmed to calculate a risk for the specific road segment. The system may also include a vehicle's computing device or a driver's computing device configured to calculate risk attributed by the vehicle or driver, respectively. By calculating real-time risk values locally, the efficiency and speed in which the system may determine risk for a road segment or produce a risk map may be increased.

Given the different equations for determining risk, it should be understood that a first road segment may have a lower risk than a second road segment under certain conditions, but a higher risk than that of the second road segment under other conditions.

Figure 8:
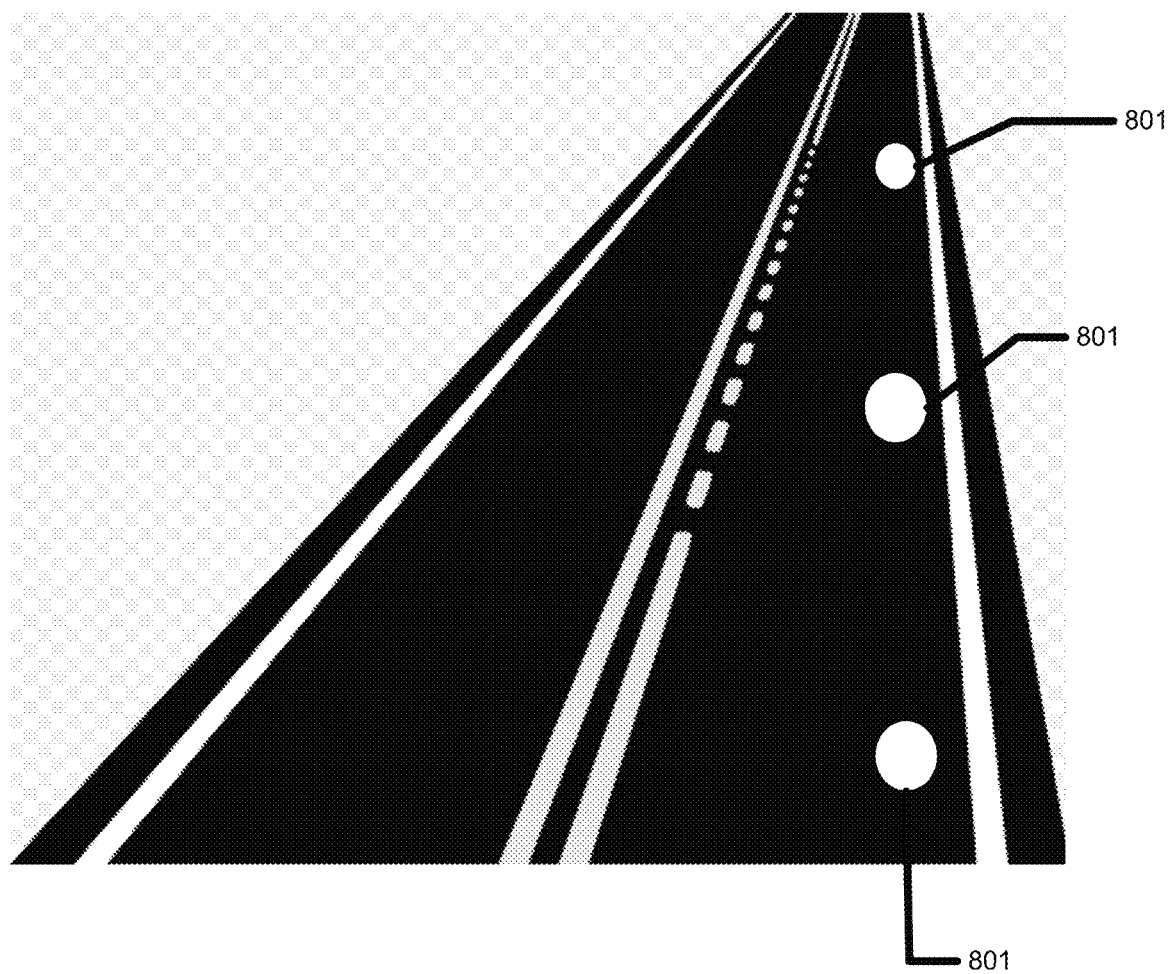
FIG. 8 illustrates an example operating environment in accordance with aspects of the present disclosure.

FIG. 8 illustrates an example system in which one or more sensors 801 may be coupled to a roadway. A vehicle (not shown) configured with one or more sensors, similar to vehicle 302 with sensor 304 shown in FIG. 3, may travel along the roadway. The sensors 801 may be configured with a processer (not shown), which may be used to calculate a risk score for a particular road segment. The sensors 801 may receive/transmit information from/to sensors coupled to a vehicle or to a user's mobile computing device (or other computing device located in the vehicle) as the vehicle passes over the sensors or the vehicle is within a certain range of the sensor. In some embodiments, the sensors 801 may function as a transceiver. In some examples, the sensors 801 may distribute and receive information from one another.

The sensors 801 may store road attribute information about a particular road segment, such as the road attribute information described previously. In addition, the sensors 801 may be any combination of the sensors described previously. In some aspects, the sensors 801 may be used to measure volume information of a particular road segment. For example, the sensors may receive information from vehicles that pass over a particular road segment and store the information about the number of vehicles that pass over the particular road segment, the time of day, the type of vehicle, the type of driver, the speed of the vehicle, etc. In some embodiments, the sensors 801 may be configured to detect weather information related to a particular road segment, e.g., raining, snowing, icy, etc.

In some embodiments, a certain number of sensors 801 may determine or define a road segment. For example, every 5 sensors 801 may designate a road segment. Distances between sensors 801 may be equal or vary. In some aspects, a road segment may be defined by a certain distance. In some embodiments, the sensors 801 may be configured or coupled to a processor/ASIC used for calculating and determining a risk score of a road segment. In some examples, each sensor 801 may have its own processor/ASIC, and in other examples, one processor/ASIC may be coupled to one or more sensors 801 via wired or wireless technology. In some embodiments, the processor/ASIC may be located remotely from the sensors 801.

Figure 9A:
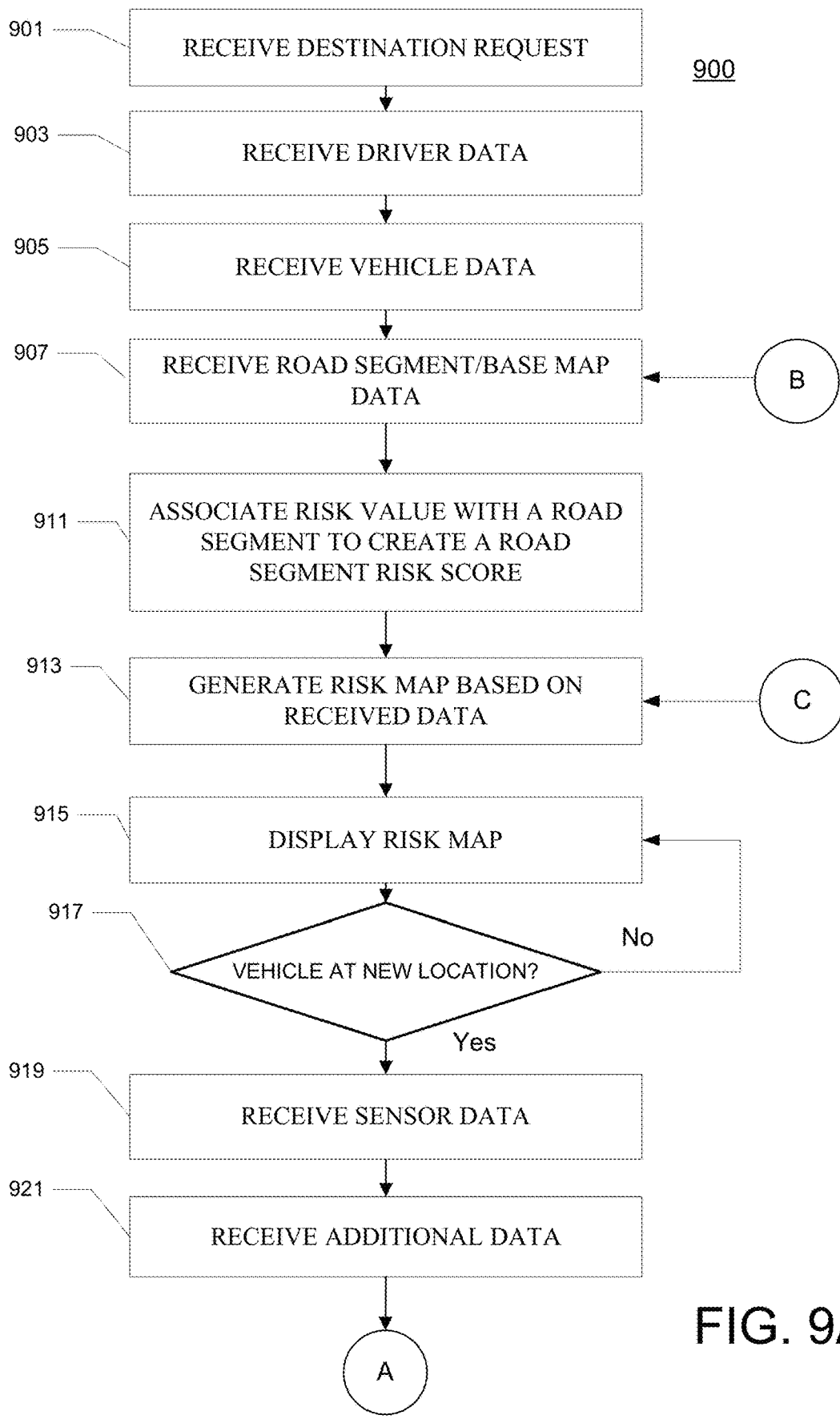
FIGS. 9A and 9B depict a flowchart of an example process in accordance with aspects of the present disclosure.
Figure 9B:
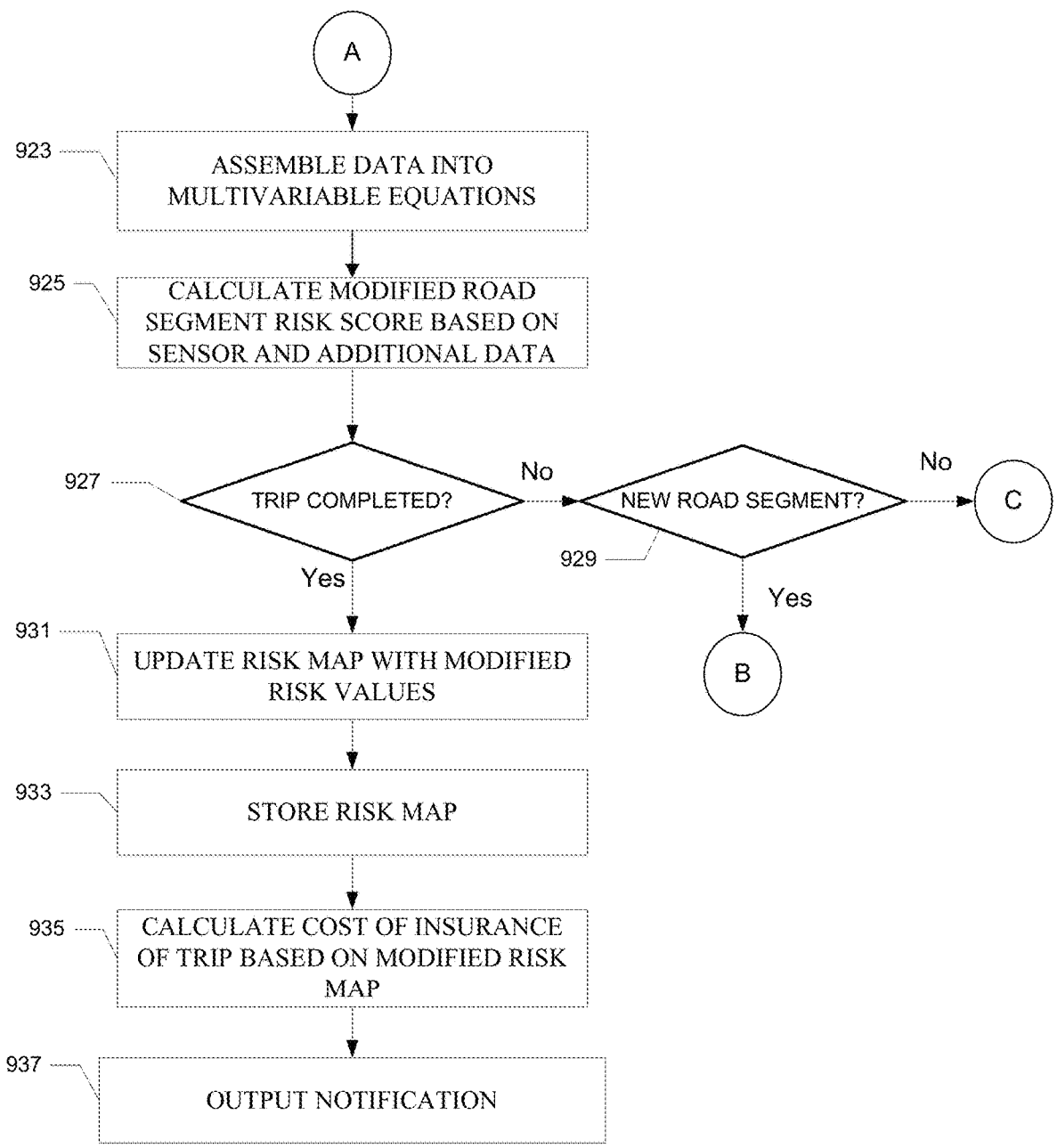

FIGS. 9A and 9B illustrate a method for generating a risk map and providing a user with a cost of insurance for a route. The method may begin at step 901. At step 901, a computing device (e.g., a mobile computing device such as a mobile phone or a vehicle's computing device) may receive a destination request. The destination request may contain information about a start and end location of a trip that a driver of a vehicle wishes to take. After receiving the destination request, the method may proceed to step 903.

At step 903, the computing device may receive driver data. The driver data may comprise an age, height, weight, eyesight score, indication whether the driver wears glasses, an indication whether the driver has any physical disabilities, demographic information, driving record (e.g., number of accidents, types of accidents, time of day of accidents, number of tickets, types of tickets, how long the driver has been driving, time between accidents and/or tickets, etc.), or the like (e.g., any other information related to the physical and mental attributes of a driver that may affect the drivers driving ability, as well as any or all information of driving history and vehicle operation). Upon completing step 903, the method may proceed to step 905.

At step 905, the computing device may receive vehicle data. Vehicle data may comprise make, model, year, drivetrain, engine size, tire wear, brake/brake pad wear, running headlights, braking system (e.g., anti-lock brakes), types of air bags (e.g., front, side, etc.), whether the vehicle has been in any accidents, etc. In some embodiments, the vehicle data may be any of the previously described vehicle data/information. After receiving the vehicle data, the method may proceed to step 907.

At step 907, the computing device may receive road segment data or base map data (e.g., road segment information or base map information). The road segment data or base map data may be any data/information previously described. In some examples, the road segment or base map data may be road attribute data. In some aspects, it may be road segment data for an individual road segment. The computing device may download the road segment data or base map data from another device or database. In some embodiments, the computing device may receive the road segment data or base map data from sensors. The road segment data or base map data may be related to the destination request at step 901. The road segment data or the base map data may be of a route or a group of routes (e.g., a plurality of road segments) used to get the vehicle to the end destination of the destination request. In some embodiments, the base map data may comprise a plurality of road segments that may create a plurality of routes. In some examples, the base map data may include risk value or risk scores for each road segment (e.g., a road segment risk score) and/or a risk value or risk score for each route (e.g., a route risk score). After step 907 has completed, the method may proceed to step 911.

At step 911, the computing device may calculate and/or associate a risk value with a road segment to create a road segment risk score. For example, the computing device may determine a driver risk value based on the driver data, a vehicle risk value based on the vehicle data, and a road segment risk value based on the road segment data. The computing device may calculate, based on the driver, vehicle, and road segment risk values, a risk score for a particular road segment and associate the risk score to the road segment to create a road segment risk score. In some embodiments, where the computing device receives base map data, the computing device may determine a road segment risk score as previously described for each road segment making up the base map. After completion of step 911, the method may proceed to step 913.

At step 913, the computing device may generate a risk map based on received data (e.g., driver data, vehicle data, and road segment data/base map data). The computing device may combine the information related to each road segment needed to reach the end destination from the start destination to create the risk map. In some aspects, the risk map may be generated as previously described. After generating the risk map, the method may proceed to step 915.

At step 915, the risk map by be displayed. The risk map may be displayed as previously described. In some instances, the risk map may be transmitted to another computing device to be displayed (e.g., to a user computing device, a mobile device, a display screen, etc.). After the risk map has been displayed, the method may proceed to step 917.

At step 917, the computing device may determine whether the vehicle has moved to a new location. The computing device may determine whether the vehicle has moved to a new location using a global positioning system (GPS) device. In some embodiments, the computing device may determine that the vehicle has moved from an OBD System. If the vehicle has not moved, then the method may proceed to step 915. If the vehicle has moved, then the method may proceed to step 919.

At step 919, the computing device may receive sensor data. Sensor data may be received while the vehicle may be moving. In some aspects, the sensor data may be similar to previously described sensor data. In some embodiments, the sensor data may be received after the vehicle passes a sensor or after a trip is over (e.g., after a vehicle reaches the destination). After receiving the sensor data, the method may proceed to step 921.

At step 921, the computing device may receive additional data. The additional data may be information similar to the additional data previously described. For example, the additional data may be weather information, e.g., raining, snowing, icy, flooded, etc. Once the additional data has been received, the method may proceed to step 923.

At step 923, the computing device may assemble the data into multivariable equations.

For example, the computing device may use the data (identified at steps 903, 905, 907, 919, and 921) to determine an updated road segment risk score. The equations may be configured for different information inputs which may affect the risk value and/or risk scores assigned to a road segment. For example, the multivariable equation may take the road segment risk score developed at step 911 and enhance/modify/adjust the risk score of the road segment based on the sensor information and the additional information. In some instances, a network device or insurance provider's server may generate and determine the multivariable equations. In some embodiments, the multivariable equations may be generated using actuarial techniques. Once the computing device assembles the received information into multivariable equations, the method may proceed to step 925.

At step 925, the computing device may calculate a modified road segment risk score by applying the additional data and the sensor information. For example, the computing device may use the determined risk scores from step 911 and use the multivariable equation from step 923 to factor in the received sensor data and/or additional data (e.g., geographic location information, weather information, and/or environmental information) to calculate a modified road segment risk score or scores. As another example, a risk score determined at step 911 may be adjusted. Under this example, the computing device may adjust a risk score due to a new condition (e.g. snow on the road). Due to the snow, the computing device may use the multivariable equation to determine that the previous risk score needs to be increased. In some examples, these modifications to risk scores may be made in real time. Also, the combination of driver data, vehicle data, road segment data, sensor data, and additional data may allow for a risk score to be calculated for a particular road segment that is unique to each individual traveling along the road segment. For example, one modified road segment risk score may be calculated for a first driver based on inputs unique to the first driver, while a different modified road segment risk score may be calculated for a second driver (different from the first driver) using one or more multivariable equations. In some embodiments, the multivariable equation used to calculate a modified road segment risk score may depend on the road segment, such that the same multivariable equation may be used for both drivers for the same road segment. Alternatively, the multivariable equation used to calculate a modified road segment risk score may depend on the driver, such that different multivariable equations may be used for the different drivers for the same road segment. Upon completion of step 925, the method may proceed to step 927.

At step 927, the computing device may determine whether the trip has been completed. The trip may be completed if the driver has reached their end destination or the vehicle has stopped moving for an extended period of time. The extended period of time may be determined by a pre-selected threshold of time determined by the driver or the insurance provider. The computing device may determine if the trip is competed based on GPS coordinates or a driver-selected input that the trip has been completed. If the trip is not completed, the method may proceed to step 929. If the trip is completed, the method may move to step 931.

At step 929, the computing device may determine if a new road segment has been reached. If a new road segment has not been reached the method may proceed to step 913. From step 913, the method may proceed through the previously mentioned steps following 913 to update the risk map based on the sensor data and additional data, display the updated risk map, and continue to receive new sensor and additional data. If a new road segment has been reached, the method may proceed to step 907. The computing device may determine a new road segment has been reached based on GPS coordinates, or based on a determination that a vehicle has traveled for a certain time or distance (e.g., by comparing time or distance measurements with a threshold). For example, if a road segment is 0.1, 0.25, 0.5, 0.75, 1, 2, 5, 10, etc. miles long, the computing device may determine that a new segment has been reached if the vehicle's odometer indicates that the vehicle has traveled a certain length. In some embodiments, the length of each road segment may be set by an insurance provider. Also, in some instances, detection of a new sensor may indicate that a new road segment has been reached. After the method proceeds to step 907, the computing device may receive road segment data or base map data for the new road segment that is being traveled, and may proceed through the steps following step 907 as previously described.

At step 931, the risk map may be updated, by the computing device, with the modified road segment risk scores. In some instances, the risk map may be continually be updated as modified risk scores are calculated. In some embodiments, the risk map may be updated with the modified risk scores at the end of the trip. The risk map may be updated as previously described. After the risk map is updated, the method may proceed to step 933.

At step 933, the computing device may store the risk map. Different parts of the risk map may be stored in different databases based on the corresponding geographical region. For example, a portion of the risk map that corresponds to one geographical area may be stored in a first database, whereas an adjacent portion of the risk map that corresponds to an adjacent geographical area may be stored in a second database. The computing device may also store the risk map as previously described. After storing the risk map, the method may proceed to step 935.

At step 935, the computing device may calculate the cost of insurance of the trip based on the modified risk map. Calculating the cost of insurance of the trip may be completed as previously described. After step 935, the method may proceed to step 937.

At step 937, the computing device may output a notification of the cost of insurance for the trip. The notification may be output as previously described.

Figure 10A:
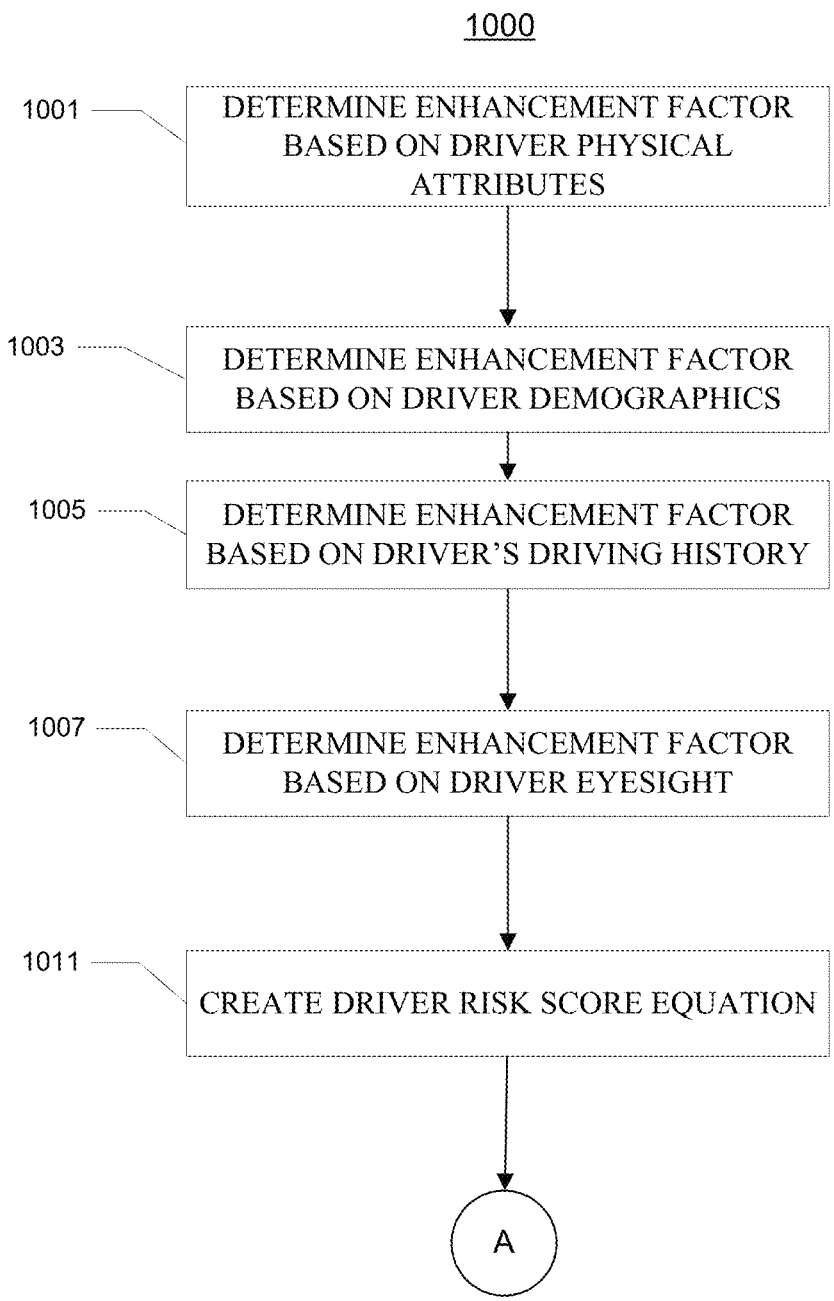
FIGS. 10A, 10B, and 10C depict a flowchart of an example process in accordance with aspects of the present disclosure.
Figure 10B:
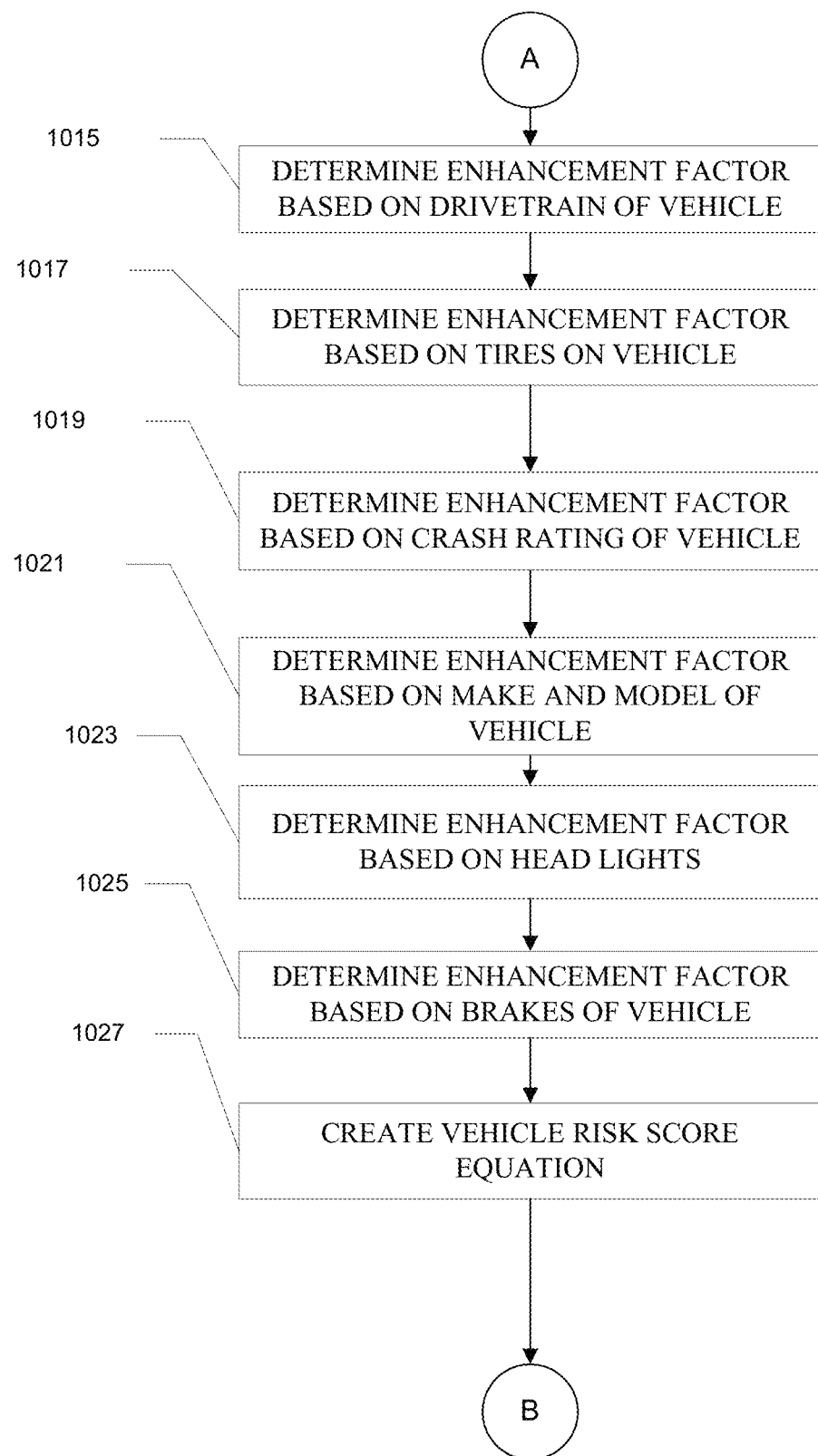
Figure 10C:
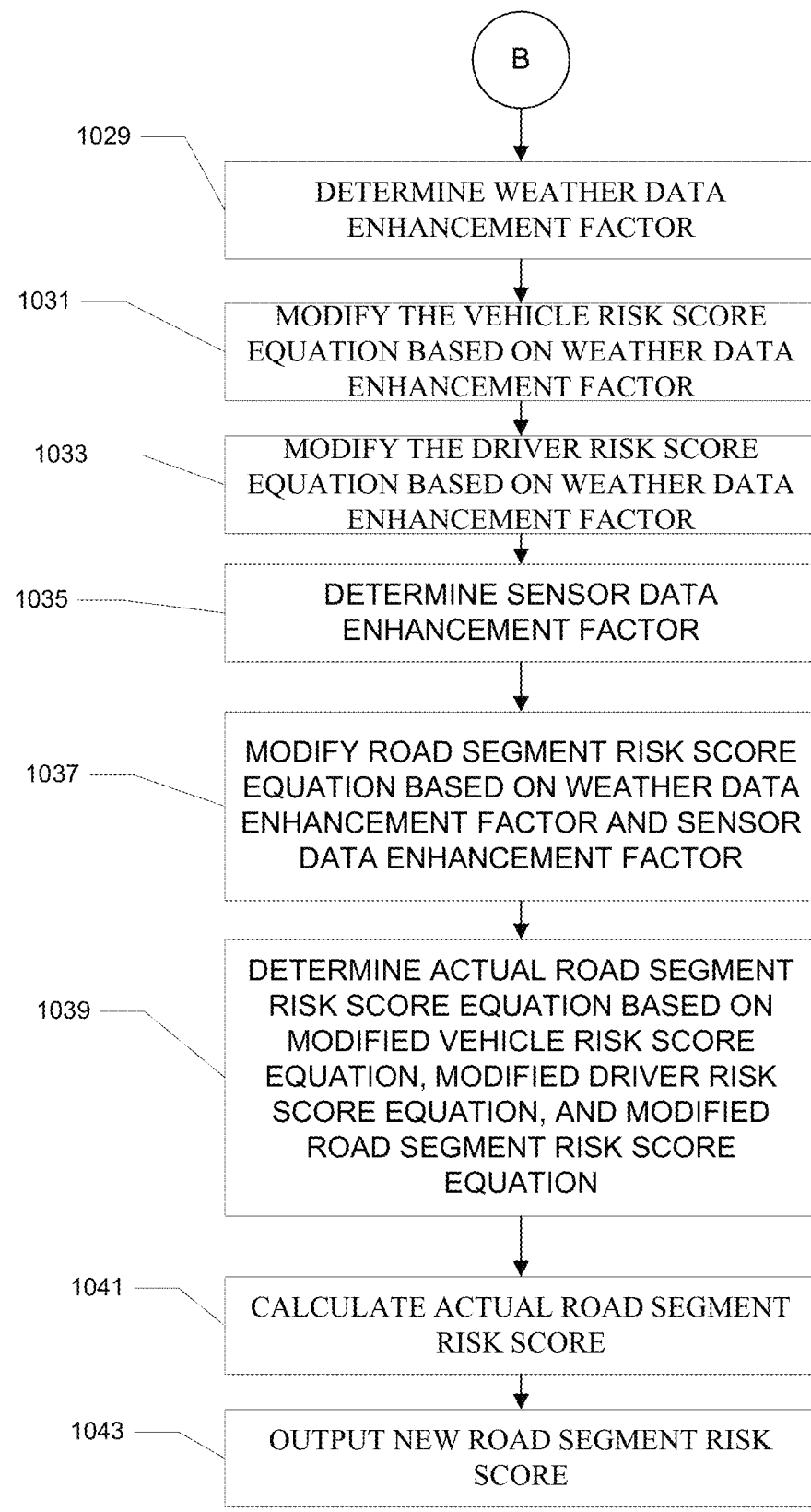

FIGS. 10A, 10B, and 10C illustrate a method for generation of a multivariable equation for determining a risk score of a road segment. The method may begin at step 1001. At step 1001, a computing device (e.g., a user's mobile device, a vehicle's computing device, or a server) may determine an enhancement factor based on driver physical attributes. The driver physical attributes may be attributes such as height, weight, eyesight score, physical impairment (e.g., broken hand), whether the driver wears glasses, prescription for glasses, and the like. The enhancement factor may be a value that may be used to adjust the risk score by increasing or decreasing certain inputs into the multivariable equation. In some aspects, the method may generate an attribute enhancement factor at step 1001. For example, a driver who wears glasses may have an attribute enhancement factor of 1.2. In some embodiments, the enhancement factor may be generated by an insurance provider or an insurance provider may determine certain thresholds or rating system for categorizing and assigning the attribute enhancement factor. In some instances, the computing device may generate a single enhancement factor per each physical attribute or an enhancement factor may be generated based on combining all the physical attributes to determine an overall attribute enhancement factor. After step 1001 is completed, the method may proceed to step 1003.

At step 1003, a computing device may determine a driver demographic enhancement factor. A demographic enhancement factor may be an enhancement factor calculated based the driver's demographics. For example, the demographic enhancement factor may be based on age. A value may be assigned to each age group, for example, a driver between the ages of 16 and 21 may be assigned an enhancement factor of 2, a driver between the ages of 21 and 25 may be assigned an enhancement factor of 1.5, a driver between the ages of 25 and 35 may be assigned an enhancement factor of 1.15, etc. Other categories for determining demographic enhancement factors may include a driver's gender (e.g., male or female), a driver's residence (e.g., people living in a city may be more experienced driving in traffic and thus less risky than others when driving on a road segment with heavy traffic), a driver's interests (e.g., people that like sky diving might be less careful and thus more risky than others), a driver's personality (e.g., people that are shy may be more careful drivers and thus less risky than others), etc. After step 1003 is completed, the method may move to step 1005.

At step 1005, the computing device may determine a driving history enhancement factor. The driving history enhancement may be a value based on the number of accidents, type of accidents, number of traffic or moving violations, type of traffic or moving violation, number of years driving, time of day that a person typically drives, and the like. Once step 1005 has completed, the method may proceed to step 1007.

At step 1007, the computing device may determine an eyesight enhancement factor. The eyesight enhancement factor may be based on whether the driver wears glasses, what the driver scored on an eyesight examination, the prescription level if the driver wears glasses, whether the driver has a near vision or far vision problem, etc. After step 1007, the method may proceed to step 1011.

At step 1011, the computing device may create a driver risk score equation. Some specific examples of the driver risk score equation include the following: $ax^n=y$; $x^b=y$; $x^n+c=y$; $ax^b=y$; $ax^n+c=y$; $x^b+c=y$; $ax^n+bx^{(n-1)}=y$; $(a*b*c*d)*x^n=y$; and $(a+b+c+d)*x^n=y$. In these equations, "a," "b," "c," and "d" may be factors whose values vary depending on the driver (e.g., may correspond to the enhancement factors based on characteristics of the driver, such as physical attributes, demographics, driving history, eyesight, etc.), "x" may correspond to time, "y" may correspond to a driver risk score, and "n" may be any number (e.g., a positive integer). Accordingly, if a baseline driver risk score equation is $ax^2=y$ where "a" corresponds to a driver's past accident/driving history, then step 1011 may comprise creating the equation $3x^2$ for a driver with an average accident/driving history or creating the equation $5x^2$ for a driver with a relatively bad accident/driving history (e.g., numerous accidents and/or tickets).

In some embodiments, the driver risk score equation may be a summation of all the enhancement factors previously described related to the driver. In some examples, the driver risk score equation may be a mathematical combination of all the previously described driver related enhancement factors. Upon completion of step 1011, the method may proceed to step 1015.

At step 1015, the computing device may create a drivetrain enhancement factor. The drivetrain enhancement factor may be based on whether a vehicle is front-wheel, rear-wheel, all-wheel, all-wheel lock, or 4×4 drive. In some instances, the drivetrain enhancement factor may be based on a vehicle having the capability of switching between the previously described drivetrains. After step 1015, the method may proceed to step 1017.

At step 1017, the computing device may determine a tires enhancement factor. The tire enhancement factor may be determined by tire wear (e.g., how worn the tires on the vehicle are). In some instances, the tire enhancement factor may be based on the type of tire, e.g., bald, threaded, rain, snow, spiked, racing, all-weather, etc. In some embodiments, the tire enhancement factor may be determined based on whether the tire is new, used, re-treaded, the brand, etc. After step 1017, the method may proceed to step 1019.

At step 1019, the computing device may determine a crash rating enhancement. The crash rating enhancement may be determined based on the crash rating of the vehicle. For example, it might be determined based on the type of air bags (e.g., front, side, curtain, front side passenger, driver only, etc.), front impact rating, side impact rating, rear end crash rating, number and type of crumple zones, rear view camera, vehicle blind spot warning system, assisted braking system, self-parking system, and the like. In some instances, the crash rating enhancement may be determined based on any feature that helps decrease the likelihood of the vehicle being in an accident as well as features that are autonomous or semi-autonomous such as self-parking systems, blind spot warning systems, lane monitoring systems (e.g., system that helps determine if a driver may be falling asleep while operating the vehicle). Upon completion of step 1019, the method may move to step 1021.

At step 1021, the computing device may determine a vehicle enhancement factor. The vehicle enhancement factor may be determined based on the make, model, year, mileage, engine size (e.g., 4 cylinder, 6 cylinder, 8 cylinder, 10 cylinder, 12 cylinder, etc.), vehicle maintenance history, etc. associated with the vehicle. For example, an all-wheel drive truck may receive a different (e.g., lower) enhancement factor than a rear-wheel drive car. After step 1021, the method may proceed to step 1023.

At step 1023, the computing device may determine a headlights enhancement factor. The headlights enhancement factor may be based on whether the vehicle has running daytime lights, the type of head lights (e.g., the type of bulbs, luminosity, etc.), whether the headlights move (e.g., able to track moving objects), whether the vehicle has fog lights, and the like. Once step 1023 is completed, the method may proceed to step 1025.

At step 1025, the computing device may determine a brake enhancement factor. The brake enhancement factor may be based on brake pad wear (e.g., how worn the brake pads are), types of brake pads, wornness of the brake discs, braking system (e.g., anti-lock brakes), and the like. Once step 1025 is completed, the method may proceed to step 1027.

At step 1027, the computing device may create a vehicle risk score equation. Some specific examples of the vehicle risk score equation include the following: $ax^n=y$; $x^b=y$; $x^n+c=y$; $ax^b=y$; $ax^n+c=y$; $x^b+c=y$; $ax^n+bx^{(n-1)}=y$; $(a*b*c*d)*x^n=y$; and $(a+b+c+d)*x^n=y$. In these equations, "a," "b," "c," and "d" may be factors whose values vary depending on the vehicle (e.g., may correspond to the enhancement factors based on characteristics of the vehicle, such as its drivetrain, tire condition, crash rating, make/model, type of head lights, type of brakes, etc.), "x" may correspond to time, "y" may correspond to a vehicle risk score, and "n" may be any number (e.g., a positive integer). Accordingly, if a baseline vehicle risk score equation is $(6-a)*x^2=y$ where "a" corresponds to a vehicle's safety rating, then step 1027 may comprise creating the equation $3x^2$ for a vehicle with a safety rating of 3 stars or creating the equation $x^2$ for a vehicle with a safety rating of 5 stars.

The vehicle risk score equation may be created using a combination of the previously described enhancement factors from steps 1015, 1017, 1019, 1021, 1023, and 1025. After the equation is created, the method may proceed to step 1029.

At step 1029, the computing device may determine a weather enhancement factor. The weather enhancement factor may be based on any of the previously described received weather data. Once the weather data enhancement score is created, the method may proceed to step 1031.

At step 1031, the computing device may modify vehicle risk score equation based on the weather enhancement factor. In some instances, the vehicle risk score equation may be modified by a factor (i.e., the weather enhancement factor) to create a modified vehicle risk score equation. After step 1031, the method may proceed to step 1033.

At step 1033, the computing device may modify the driver risk score equation based on weather enhancement factor. Similar to the previous step 1031, the driver risk score equation may be modified by a factor (i.e., weather enhancement factor) to create a modified vehicle risk score equation. After step 1033, the method may move to step 1035.

At step 1035, the computing device may determine a sensor data enhancement factor. The sensor data enhancement factor may be based on received sensor data. The sensor data may be any sensor data previously described. The computing device may have access (remote access or local access) to one or more tables that map road conditions to factor values. If a person drove near a sensor that informed the person's phone that an associated road segment is in poor condition, such information could be translated (or converted) into a factor value using the table. For example, a table could be employed to translate sensor data indicating good road conditions to a factor value of "1" or to translate sensor data indicating poor road conditions to a factor value of "5." As another example, if a person drove near a sensor that informed the person's phone that the average speed of all cars on an associated road segment (e.g., within the last 10 mins.) is 70 mph, such information could be translated into a factor value using one of the one or more tables. In some embodiments, average speeds within a first range (e.g., greater than 50 mph) would be translated into a first factor value, while average speeds within a second range (e.g., less than 25 mph) would be translated into a second factor value. It should be understood that different thresholds and range sizes could be used in different embodiments. Upon completion of step 1035, the method may proceed to step 1037.

At step 1037, the computing device may modify the road segment risk score equation based on the weather enhancement factor and the sensor data enhancement factor. In some instances, modifying the road segment risk score equation may include creating a modified road segment risk score equation using the weather enhancement factor and the sensor data enhancement factor. Some specific examples of the modified road segment risk score equation include the following: $ax^n=y$; $x^b=y$; $x^n+c=y$; $ax^b=y$; $ax^n+c=y$; $x^b+c=y$; $ax^n+bx^{(n-1)}=y$; $(a*b*c*d)*x^n=y$; and $(a+b+c+d)*x^n=y$. In these equations, "a," "b," "c," and "d" may be factors whose values vary depending on road segment characteristics, weather, or sensor data (e.g., may correspond to the enhancement factors based on characteristics of the road segment, such as a condition of the road segment, surface type of the road segment, whether the road segment is currently wet, icy, or otherwise slippery, whether there is fog on the road segment, etc.), "x" may correspond to a time or distance from a start of the road segment, "y" may correspond to a road segment risk score, and "n" may be any number (e.g., a positive integer). Accordingly, if a baseline road segment risk score equation is $ax^2=y$ where "a" corresponds to a degree of fog or degree of precipitation (e.g., on a scale of 1 to 10), then step 1011 may comprise creating the equation $2x^2$ for a road segment currently associated with a low degree of fog or precipitation or creating the equation $9x^2$ for a road segment currently associated with a high degree of fog or precipitation. Upon completion of step 1037, the method may move to step 1039.

At step 1039, an actual road segment risk score equation may be created by the computing device. The actual road segment risk score equation may be an equation for providing a risk score for a particular driver driving a particular vehicle on a particular road segment. The actual road segment risk score equation may be based on the modified vehicle risk score equation, modified driver risk score equation, and a modified road segment risk score equation. The actual road segment risk score equation may be formed by combining the modified driver, vehicle, and road segment risk score equations. These equations may be combined to create a unique equation for a specific instance in which a specific person drives a specific vehicle over a specific road segment. Some specific examples of the actual road segment risk score equation include the following: $ax^n=y$; $x^b=y$; $x^n+c=y$; $ax^b=y$; $ax^n+c=y$; $x^b+c=y$; $ax^n+bx^{(n-1)}=y$; $(a*b*c*d)*x^n=y$; $(a+b+c+d)*x^n=y$; $ax^n+bx^n+cx^n=y$. In these equations, "a," "b," "c," and "d" may be factors whose values vary depending on the driver, vehicle, road segment condition, weather, and/or sensor data (e.g., "a" may be based on a characteristic of the driver, "b" may be based on a characteristic of a vehicle, "c" may be based on a characteristic of the road segment, and "d" may be based on a characteristic of the weather), "x" may correspond to a time or distance from a start of the road segment, "y" may correspond to an actual road segment risk score, and "n" may be any number (e.g., a positive integer). Upon completion of step 1039, the method may proceed to step 1041.

At step 1041, the computing device may calculate an actual road segment risk score. This actual road segment risk score may be calculated using the equation created at step 1039 or as previously described throughout the specification. In some examples, the actual road segment risk score may be on a scale of 0 to 100. After step 1041, the method may proceed to step 1043.

At step 1043, the computing device may output the actual road segment risk score. In some embodiments, outputting the actual road segment risk score may result in a risk map being updated and displayed to a driver of a vehicle.

In light of the present disclosure, it should be understood that various steps of the methods of FIGS. 9A, 9B, 10A, 10B, and 10C may be added, omitted, combined, re-ordered, or modified.

Further, it should be understood that aspects of this disclosure may be applied to generate risk maps for waterways and flight patterns, depicting risks incurred during boat trips and flights (e.g., plane or helicopter trips). More specifically, waterways may be broken into waterway segments in a similar manner as roads are broken into road segments, and actual risks of travelling over various waterway segments during a specific boat trip may be determined in a similar manner that the actual risks of travelling over various road segments during a car trip may be determined. Likewise, flight patterns may be broken into airway segments in a similar manner as roads are broken into road segments, and actual risks of travelling over various airway segments during a particular flight may be determined in a similar manner that the actual risks of travelling over various road segments during a car trip may be determined.

Of course, where waterway segments and airway segments are being evaluated, different factors may be considered. For example, in the case of a boat trip, information about the boat (e.g., number of engines, type of engine (inboard or outboard), whether the boat has tabs, etc.) used to adjust the risk may be different than information about the car discussed above. Also, information about the water segments (e.g., depth, current strength, etc.) may be different from the information about the road segments (e.g., road slope or surface type, etc.). Meanwhile, in the case of a flight, information about the plane/helicopter (e.g., propeller size) used to adjust the risk may be different than information about the car. Also, information about the airway segments (e.g., wind speeds, altitude, degree of bird migration, etc.) may be different from the information about the road segments (e.g., road slope or surface type, etc.).

Figure 11A:
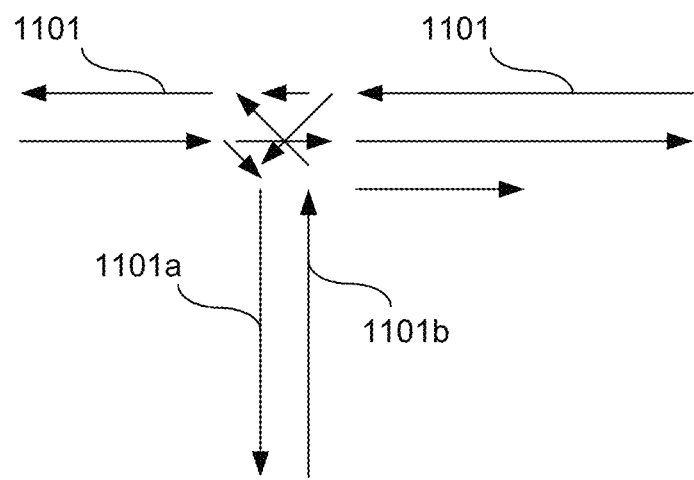
FIGS. 11A and 11B illustrate example segments in accordance with aspects of the present disclosure.

FIG. 11A illustrates segments 1101 at an example intersection between two roads. Each arrow represents a different segment of the road. A two lane road may have two segments—one for each lane. The direction of the arrow corresponds to the direction of travel for the corresponding segment. For example, referring to FIG. 11A, road segment 1101a may correspond to a southbound lane of a road, whereas road segment 1101b may be a northbound lane of the same road. Also, as shown in FIG. 11A, some road segments may represent turns that could be made to get from one lane on one road to another lane on another road. Accordingly, and as illustrated in FIG. 11A, segments may overlap or cross paths.

In addition, segments may have different lengths. In FIG. 11A, the road on the right of the intersection has three segments—one segment for travelling in a left direction and two segments for traveling in a right direction. Notably, one of the segments for traveling in the right direction is longer than the other. This may be because the other segment corresponds to a lane that ends (e.g., a turn lane, merge lane, or shoulder).

For ease of understanding, the segments in FIG. 11A were treated as segments of a road (e.g., road segments), but it should be understood that the intersection could be between two waterway channels or two flight paths and thus the segments could be waterway segments or airway segments. In such cases, similar principles as those discussed above for the road segments could apply.

Figure 11B:
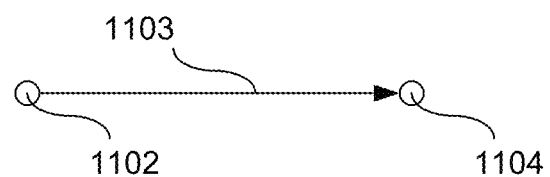

FIG. 11B illustrates an example composition of a segment. Each segment may have a starting point 1102, a middle portion 1103, and an ending point 1104. The starting point 1102 and ending point 1104 may be defined by 3D coordinates (e.g., GPS coordinates representing a latitude, longitude, and altitude). The middle portion 1103 may be defined by a set of 3D coordinates or a vector.

Each segment in FIGS. 11A and 11B may be associated with a risk score. The risk score may be a value within a predefined range (e.g., 0 to 100). In some embodiments, the risk score may change over time or be variable depending on various conditions (e.g., weather, traffic, etc.). In some embodiments, the risk score of a segment may be different for different portions of the segment. For example, the risk score at the starting point 1102 of a segment may be different than the risk score at the ending point 1104 of the segment. The risk score throughout the middle portion 1103 of the risk score may also vary.

Figure 12A:
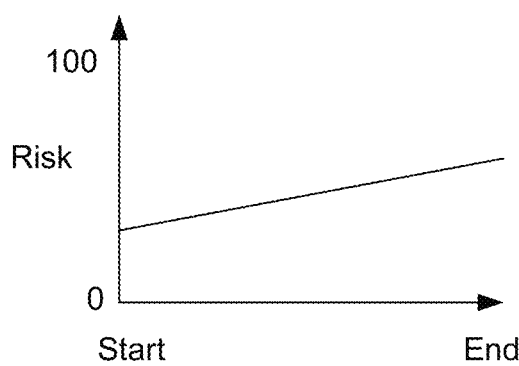
FIGS. 12A-12D illustrate example risk curves that may be determined in accordance with aspects of the present disclosure.

FIGS. 12A-12D illustrate example risk curves that express how the risk of a segment may vary. In each of FIGS. 12A-12D, the x-axis represents a segment from its starting point 1102 (e.g., "Start") to its ending point 1104 (e.g., "End"), while the y-axis represents the level of risk (e.g., a risk score on the scale of 0 to 100) for the segment. FIG. 12A illustrates that the risk may be linear. That is, the risk may be lower (e.g., safer) at the start/beginning of the segment and steadily increase until the end of the segment. Thus, in the example of FIG. 12A, the end of the segment may be more dangerous than the start. In other examples, the risk may be linear and the start of the segment may be more dangerous than the end of the segment.

Figure 12B:
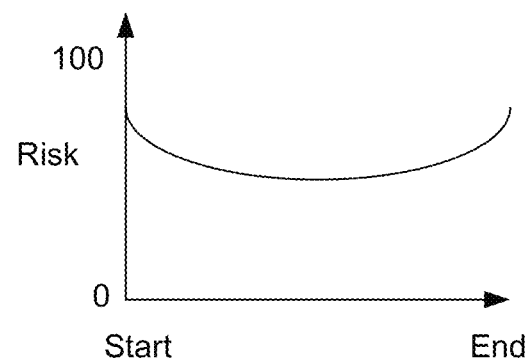

FIG. 12B illustrates that the risk may be parabolic. In the example of FIG. 12B, the risk may be lower in the middle of the segment. In some examples, the parabolic curve may be flipped such that the risk is higher in the middle of the segment.

Figure 12C:
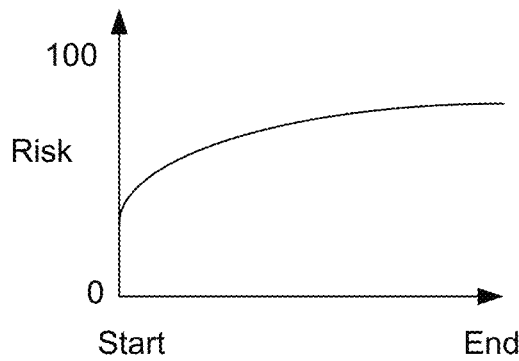

FIG. 12C illustrates that the risk may be logarithmic. In the example of FIG. 12C, the risk quickly escalates but then levels off towards the end of the segment. In some examples, the risk may be logarithmic, and drop quickly at the start but then level off towards the end of the segment. Further, in some examples, the risk may be logarithmic and start off increasing slowly before increasing quickly towards the end of the segment. Or, in some examples, the risk may be logarithmic and start off decreasing slowly before decreasing quickly towards the end of the segment.

Figure 12D:
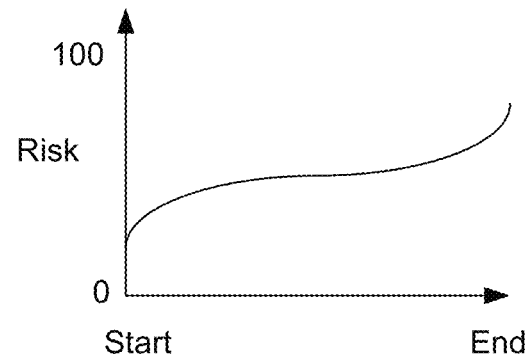

FIG. 12D illustrates that the risk may be a polynomial. Although FIG. 12D shows the polynomial as an S-curve, the risk may be expressed by more complex polynomials in some examples.

In accordance with the present disclosure, one or more computing devices (e.g., servers, computers, etc.) may be configured to determine the risk for segments. For example, one or more computing devices may be configured to determine whether the risk for a segment is linear, parabolic, logarithmic, or polynomial. A computing device (e.g., server) may receive, from various sources, data for computing the risk over a segment and may plot points indicating a level of risk at various points along the segment. In some instances, depending on the data received, multiples levels of risk may be computed for the same point along the segment. For example, a computing device may receive, from two different sources, data regarding risk for the same point along the segment, and therefore, may plot two points for that point along the segment. In some systems, a first computing device may receive a first set of data and plot one point for a point along the segment, while a second computing device may receive a second set of data and plot another point for the same point along the segment. After plotting points for a segment, a computing device may fit a curve to the points. Various curve-fitting techniques, including interpolation, smoothing, linear regression, and polynomial regression, may be used to fit a curve or line to the plotted points. In addition, in some embodiments, a computing device may determine the expression or function that best describes/represents the curve or line. The smooth curve or line and/or expression/function may be stored in a database or other memory for later use.

A computing device (e.g., a mobile computing device, vehicle computing device, etc.) may be configured to access the smooth curve and/or expression/function and configured to determine the level of risk that may be encountered along a planned trip or current trip. Moreover, the smooth curve and/or expression/function may be used to determine a level of risk (e.g., risk score) for a point along a segment for which data has not been received. It may be that the system does not receive data for all points along a segment or receives varying data for a specific point along the segment. In such situations, the curve and/or expression/function may be useful for quickly computing the level of risk for a given point along the segment. For example, a mobile computing device or vehicle computing device may determine its location (e.g., receive its GPS coordinates) and use the curve and/or expression/function to quickly determine its current or approaching level of risk, without having to determine whether data is available, determine which data is most relevant, and/or process the data each time a level of risk is desired. The curve and/or expression/function may be particularly useful for an autonomous vehicle designed to use risk levels to control its driving/operation and seeking to deliver a smooth driving experience. For example, an autonomous vehicle may use the curve and/or expression/function to brake or accelerate smoothly as opposed to reacting to data points that might jump around. The curve and/or expression/function may also help to conserve computer memory and thus may reduce storage requirements. Rather than having to store all data points, a mobile computing device or vehicle computing device may simply store a curve and/or expression/function.

In some embodiments, the curve(s) and/or line(s) computed for road segments may be displayed to a driver in real time. For example, a driver may be shown a curve or line expressing the risk of the road segment he/she is driving currently driving on. In other embodiments, the curve(s)/line(s) may be used to generate a map or other graphic illustrating the risk throughout the portions of a road segment. For example, if risk of a particular road segment is expressed as an increasing line, this line may be used to generate a bar or line (which may be superimposed on a map) that changes colors from green (indicating low risk) to yellow (indicating medium risk) to red (indicating high risk). The change in color may be a function of the curve or line. In some cases, instead of changing the color, the brightness or hue may be changed according to the curve or line. For example, a bar displayed to the driver to represent the risk of a road segment may change from bright blue to dark blue and back to bright blue if the road segment is associated with relatively high risk at its start and end but relatively low risk at its middle. Still, in some examples, the curves/lines expressing risk may be used to choose whether a line or bar (e.g., superimposed on a map) is illustrated as a solid line, dashed line, dotted line, etc. Additionally, or alternatively, the risk curves/lines could be used to select which portion of a bar or line (on a map) should blink to indicate portions of a road segment that might be risky. Another aspect of this disclosure related to the display of the riskiness of a road segment is to take into account the resolution of the display. For example, if a screen or other interface is associated with a low resolution, then only 2 colors or brightness/hue levels may be used to represent the curves/lines that express the level of risk of a road segment, whereas if a screen or other interface is associated with a high resolution, then more than 2 colors or brightness/hue levels may be used to represent the curves/lines that express the level of risk of the road segment. Also, if a user zooms out to view a larger section of a map, fewer colors (or other risk delineations) may be used to represent the risk of a road segment in comparison to a number of colors (or other risk delineations) used when a user zooms in so as to view only a few road segments at once.

Although not shown, trigonometric functions (e.g., sine, cosine, tangent, cotangent, etc.) may also be used to express risk in a smooth manner. Such trigonometric functions may be especially desired where the risk may be cyclical. For example, a single period of a sine wave may be used to represent risk along a segment. Further, multi-dimensional expressions/functions may also be used to express risk. For example, in addition to the two dimensions for risk and location within the road segment, a third dimension for another variable may be incorporated into the expression/function. Adding in one or more additional variables could help an autonomous vehicle "think" and "understand" the risk map in a smooth and precise manner using less storage than a "raster" approach.

The system may use other variables, including variables to capture road geometry (e.g., potholes), to compress a point cloud into a smooth vector "shape." The variables could be used to define the world (e.g., used to create a mesh showing the road and/or objects that pose a risk) or guide a vehicle (autonomous or semi-autonomous) to prepare for risk or alert a driver of risk. Example alerts may include gently applying the brakes, tightening a seat belt, disabling or enabling a drive-by-wire, lowering or raising radio volume, controlling an HVAC system to produce a puff, vibrating a seat, displaying an alert, etc.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, where the described implementation includes software, it should be understood that a combination of hardware and software or hardware alone may be used in various other embodiments. Additionally, although aspects of the present disclosure are described as being stored in memory, one skilled in the art will appreciate that these aspects can also be stored on other types of computer-readable media (including transitory/non-transitory computer-readable media), such as secondary storage devices, like hard disks, floppy disks, or CD-ROM; a carrier wave from the Internet or other propagation medium; or other forms of RAM or ROM.

What is claimed is:

1. A system comprising:
   one or more sensors associated with a specific road segment, the one or more sensors configured to:
      detect sensor information indicating an attribute of the specific road segment; and
      transmit the sensor information; and
   a mobile computing device configured to:
      receive trip request information indicating a destination of a trip to be traveled by a vehicle driven by a driver;
      determine a route for the driver to travel in the vehicle based on the trip request information;
      receive base map information, vehicle information, and driver information;
      receive, from the one or more sensors when the mobile computing device wirelessly connects to the one or more sensors, the sensor information;
      assemble the sensor information, base map information, vehicle information, and driver information into one or more multivariable equations;
      determine, using the one or more multivariable equations, a risk score for one or more road segments of a plurality of road segments forming the route to obtain one or more risk scores;

generate a risk map based on the one or more risk scores; and output, on a display, the risk map.

2. The system of claim 1, wherein the base map information comprises volume data and accident data, and wherein the volume data comprises information indicating a number of vehicles traveling over a particular road segment of the plurality of road segments, and the accident data comprises information indicating a number of accidents on the particular road segment.

3. The system of claim 1, wherein the vehicle information comprises information indicating a make of the vehicle, a model of the vehicle, a year of the vehicle, a condition of brakes of the vehicle, a tire rating of a tire of the vehicle, whether the vehicle has running headlights, an engine size of the vehicle, or a type of transmission of the vehicle, and wherein the vehicle information is received via an on-board diagnostic system.

4. The system of claim 1, wherein the driver information comprises information indicating a height of the driver, an eyesight test score associated with the driver, whether the driver wears glasses, an age of the driver, a number of years of driving experience of the driver, a number of accidents in which the driver has been involved, a number of traffic violations the driver has received, a type of traffic violation the driver has received, or a road or weather condition during an accident in which the driver has been involved.

5. The system of claim 1, wherein the mobile computing device is configured to:

calculate, based on the one or more risk scores, a route risk score; and determine an insurance premium for traveling the route based on the route risk score.

6. The system of claim 1, wherein the mobile computing device is configured to:

assemble the driver information into a driver risk score equation;

assemble the vehicle information into a vehicle risk score equation; and assemble a first result of the driver risk score equation and a second result of the vehicle risk score equation into the one or more multivariable equations.

7. The system of claim 1, wherein the mobile computing device is configured to:

determine that a particular risk score, of the one or more risk scores, exceeds a threshold;

identify a particular road segment corresponding to the particular risk score;

update the risk map with a symbol that indicates the particular road segment has been identified as dangerous; and output, on the display, the updated risk map.

8. A method comprising:

receiving, by a mobile computing device, trip request information indicating a destination of a trip to be traveled by a vehicle driven by a driver;

determining, by the mobile computing device, a route for the driver to travel in the vehicle based on the trip request information;

receiving, by the mobile computing device when the mobile computing device wirelessly connects to one or more sensors, sensor information indicating an attribute of a specific road segment associated with the one or more sensors;

receiving, by the mobile computing device, driver information, vehicle information, and base map information;

generating, based on the sensor information, driver information, vehicle information, and base map information, one or more multivariable equations;

determining, using the one or more multivariable equations, a risk score for one or more road segments of a plurality of road segments forming the route to obtain one or more risk scores;

generating, by the mobile computing device, a risk map based on the one or more risk scores; and outputting, on a display, the risk map.

9. The method of claim 8, wherein the base map information comprises volume data and accident data, and wherein the volume data comprises information indicating a number of vehicles traveling over a particular road segment of the plurality of road segments, and the accident data comprises information indicating a number of accidents on the particular road segment.

10. The method of claim 8, wherein the vehicle information comprises information indicating a make of the vehicle, a model of the vehicle, a year of the vehicle, a condition of brakes of the vehicle, a tire rating of a tire of the vehicle, whether the vehicle has running headlights, an engine size of the vehicle, or a type of transmission of the vehicle, and wherein the vehicle information is received via an on-board diagnostic system.

11. The method of claim 8, wherein the driver information comprises information indicating a height of the driver, an eyesight test score associated with the driver, whether the driver wears glasses, an age of the driver, a number of years of driving experience of the driver, a number of accidents in which the driver has been involved, a number of traffic violations the driver has received, a type of traffic violation the driver has received, or a road or weather condition during an accident in which the driver has been involved.

12. The method of claim 8, further comprising:

calculating, based on the one or more risk scores, a route risk score; and determining, based on the route risk score, an insurance premium for traveling the route.

13. The method of claim 8, further comprising:

generating, based on the driver information, a driver risk score equation; and generating, based on the vehicle information, a vehicle risk score equation, wherein the one or more multivariable equations comprise the driver risk score equation and the vehicle risk score equation.

14. The method of claim 8, further comprising:

determining whether any of the one or more risk scores forming the route exceed a threshold;

in response to determining that a particular risk score exceeds the threshold, identifying a particular road segment corresponding to the particular risk score;

updating the risk map with an indicator highlighting the particular road segment; and outputting, on the display, the updated risk map.

15. A non-transitory computer-readable storage medium storing computer-executable instructions that, when executed by a mobile computing device, cause the mobile computing device to:
    receive trip request information indicating a destination of a trip to be traveled by a vehicle driven by a driver;
    determine a route for the driver to travel in the vehicle based on the trip request information;
    receive, when the mobile computing device wirelessly connects to one or more sensors, sensor information indicating an attribute of a specific road segment associated with the one or more sensors;
    receive driver information, vehicle information, and base map information;
    generate, based on the sensor information, driver information, vehicle information, and base map information, one or more multivariable equations;
    determine, using the one or more multivariable equations, a risk score for one or more road segments of a plurality of road segments forming the route to obtain one or more risk scores;
    generate a risk map based on the one or more risk scores; and
    output, on a display, the risk map.

16. The non-transitory computer-readable storage medium of claim 15,
    wherein the sensor information indicates a slope of the specific road segment, a surface type of the specific road segment, that a pothole exists on the specific road segment, that the specific road segment is uneven, that the specific road segment is wet, a number of lanes of the specific road segment, a speed limit of the specific road segment, or that the specific road segment is under construction.

17. The non-transitory computer-readable storage medium of claim 15, wherein the driver information comprises information indicating a height of the driver, an eyesight test score associated with the driver, whether the driver wears glasses, an age of the driver, a number of years of driving experience of the driver, a number of accidents in which the driver has been involved, a number of traffic violations the driver has received, a type of traffic violation the driver has received, or a road or weather condition during an accident in which the driver has been involved.

18. The non-transitory computer-readable storage medium of claim 15, wherein the computer-executable instructions, when executed, further cause the mobile computing device to:
    determine a driver risk score equation based on the driver information;
    determine a vehicle risk score equation based on the vehicle information;
    determine a preliminary road segment risk score equation for the specific road segment based on the base map information and the sensor information;
    determine a road segment risk score equation based on the driver risk score equation, the vehicle risk score equation, and the preliminary road segment risk score equation; and
    execute the road segment risk score equation to determine a particular risk score for the specific road segment, wherein the particular risk score is one of the one or more risk scores.

19. The non-transitory computer-readable storage medium of claim 15, wherein the computer-executable instructions, when executed, cause the mobile computing device to:
    dynamically update the risk map based on the sensor information to add or remove a risk object overlaying a portion of the risk map corresponding to the specific road segment.

20. The non-transitory computer-readable storage medium of claim 15,
    wherein the sensor information comprises information obtained from another vehicle different from the vehicle.

\* \* \* \* \*